(12) United States Patent
dePoo

(10) Patent No.: US 9,770,048 B2
(45) Date of Patent: *Sep. 26, 2017

(54) RESEALABLE SPOUT FOR SELECTIVELY ACCESSING COCONUT WATER WITHIN A COCONUT

(71) Applicant: Paul dePoo, Key West, FL (US)

(72) Inventor: Paul dePoo, Key West, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,960

(22) Filed: Jun. 8, 2015

(65) Prior Publication Data

US 2016/0066615 A1    Mar. 10, 2016

Related U.S. Application Data

(63) Continuation of application No. 13/839,516, filed on Mar. 15, 2013, now Pat. No. 9,049,885, which is a
(Continued)

(51) Int. Cl.
*B67D 1/00* (2006.01)
*A23N 1/00* (2006.01)
(Continued)

(52) U.S. Cl.
CPC .................. *A23N 1/00* (2013.01); *A23L 2/04* (2013.01); *A23L 19/03* (2016.08); *A47J 19/00* (2013.01);
(Continued)

(58) Field of Classification Search
CPC .. B65D 25/40; B65D 85/72; B65D 2231/022; A47J 19/00; B26D 3/26; A23N 1/00
(Continued)

(56) References Cited

U.S. PATENT DOCUMENTS

| 1,506,571 A | 8/1924 | Deremberg |
| 1,992,479 A | 2/1935 | Santiago |

(Continued)

FOREIGN PATENT DOCUMENTS

| CN | 2494604 Y | 6/2002 |
| CN | 1389157 A | 1/2003 |

(Continued)

*Primary Examiner* — Lien Ngo

(57) ABSTRACT

A resealable spigot for a coconut that provides easy access by consumers to the sterile coconut water within a coconut includes a valve seat positioned within a coconut aperture and a plunger sleeve positioned within the valve seat. The plunger sleeve has a based positioned membrane that seals the coconut aperture, A plunger-stopper is tethered to the plunger sleeve for shipping and storage and is used by the consumer to pierce the plunger sleeve membrane to gain access to the coconut water. The plunger sleeve is also used to reseal the coconut aperture to preserve any remaining coconut water for future consumption. Further provided is an additional embodiment for a spigot comprising a conduit having a spike-tip on one end and a spout on the other with a through bore therebetween. The coconut having a partially inserted spigot is provided to the consumer whereby the consumer gains access to the sterile coconut water by pushing the partially inserted spigot to its seated position with a grommet provided as an insertion stop for the spigot. An optional air vent is provided to aid in fluid flow from the spigot.

12 Claims, 30 Drawing Sheets

Related U.S. Application Data continuation of application No. PCT/US2011/047147, filed on Aug. 9, 2011, and a continuation of application No. 12/793,097, filed on Jun. 3, 2010, now Pat. No. 8,709,519.

(51) Int. Cl.

| | | |
|---|---|---|
| *B26D 3/26* | (2006.01) | |
| *A47J 19/00* | (2006.01) | |
| *B65D 25/40* | (2006.01) | |
| *B65D 85/72* | (2006.01) | |
| *A23L 2/04* | (2006.01) | |
| *B65D 25/48* | (2006.01) | |
| *A23L 19/00* | (2016.01) | |

(52) U.S. Cl.
CPC ............ *B26D 3/26* (2013.01); *B65D 25/40* (2013.01); *B65D 25/48* (2013.01); *B65D 85/72* (2013.01)

(58) Field of Classification Search
USPC ............... 222/80–83, 83.5, 87–91; 426/489; 30/113.1, 113.3, 120.1
See application file for complete search history.

(56) References Cited

U.S. PATENT DOCUMENTS

| | | | |
|---|---|---|---|
| 4,881,662 A | 11/1989 | Tallman | |
| 4,889,044 A * | 12/1989 | Rosenfield | A47J 19/022 100/108 |
| 5,005,336 A | 4/1991 | Bloom | |
| 5,884,810 A | 3/1999 | Vizcarra | |
| 7,959,967 B2 * | 6/2011 | Pattenden | B26D 3/26 426/482 |
| 8,109,236 B2 * | 2/2012 | Brodowski | A01N 25/34 119/71 |
| 2002/0004094 A1 * | 1/2002 | Rancier | A23L 25/40 426/592 |
| 2004/0104246 A1 | 6/2004 | Kawaguchi | |
| 2004/0245286 A1 | 12/2004 | Lee | |
| 2005/0269354 A1 * | 12/2005 | Smith | B67D 3/0019 222/83 |
| 2008/0116204 A1 * | 5/2008 | Ohse | B01L 3/50825 220/254.6 |
| 2009/0291172 A1 * | 11/2009 | Saez | A23L 2/56 426/330.5 |

FOREIGN PATENT DOCUMENTS

| | | | |
|---|---|---|---|
| CN | 101486962 A | | 7/2009 |
| CN | 201501627 U | | 6/2010 |
| FR | 2721590 | * | 6/1994 |
| FR | 2778270 | * | 3/1998 |
| FR | 2867162 A1 | | 9/2005 |
| GB | 2136344 A | | 9/1984 |
| GB | 2323549 A | * | 9/1998 |
| IN | 20060223914 | | 1/2007 |

* cited by examiner

RESEALABLE SPOUT FOR SELECTIVELY ACCESSING COCONUT WATER WITHIN A COCONUT

CROSS-REFERENCE TO RELATED APPLICATIONS

This patent application is a continuing application of application Ser. No. 13/839,516, filed Mar. 15, 2013, published as US2014/0044848A1, now U.S. Pat. No. 9,049,885, which is a continuation of and is related to International application no. PCT/US11/47147 filed on Aug. 9, 2011, published as WO2013/022439; application Ser. No. 13/839,516 is also a continuation of U.S. utility application Ser. No. 12/793,097 filed on Jun. 3, 2010; all of which are incorporated herein by reference in entirety.

BACKGROUND

Technical Field of the Invention

The present invention relates generally to spigots and, more specifically, to a spigot for a coconut that provides easy access by consumers to the sterile coconut water within a coconut. The spigot is comprised of a conduit having a spike-tip on one end and a spout on the other with a through bore therebetween. A retaining ring is also provided as a stop for the spigot. A spigot cap is placed over the spigot and covered with a protective member.

The coconut having a spigot is provided to the consumer whereby the consumer gains access to the sterile coconut water by pushing the partially inserted spigot to its seated position.

Initially the spigot is inserted through the husk and into the coconut meat having a length of un-inserted conduit extending from the exterior. The spigot remains within the coconut meat until time of use maintaining the sterile condition of the coconut water until selective consumption by the consumer.

The present invention further provides for an optional air vent and straw that optionally provides for a filter to prevent pulp from being drawn into the straw.

Further provided are the additional elements of a coconut stand and handle mountable to the coconut and a spigot having a plunger movable from a fluid blocking position within the spigot to an unblocking position so that the coconut water can be poured into a glass.

SUMMARY

A primary object of the present invention is to provide spigot access to the coconut water within a coconut.

Another object of the present invention is to provide access to coconut water within a coconut by initially inserting the spigot through the husk and into the coconut meat without piercing the coconut water cavity.

Yet another object of the present invention is to provide a spigot having a cap that is placed over the partially inserted spigot to prevent casual displacement of the spigot during shipping and handling.

Still yet another object of the present invention is to provide a spigot a protective member serving as a tamper evident seal.

An additional object of the present invention is to provide easy access by consumers to the coconut water within a coconut without compromising its sterile contents.

A further object of the present invention is to provide a spigot that will provide access to the coconut water within a coconut by a consumer pressing the spigot through the remained of the coconut meat and into the coconut water cavity.

A yet further object of the present invention is to provide an optional air vent having a resealable aperture.

A still further object of the present invention is to provide a straw that may have a filter on one end to prevent pulp from being drawn in.

Another object of the present invention is to provide a stand for a coconut.

Yet another object of the present invention is to provide a handle attachable to a coconut.

Still yet another object of the present invention is to provide a spigot having a plunger that is movable from a blocking position to an unblocking position so that the coconut water can be poured into a glass.

The foregoing and related objects are achieved by the present invention, which provides a resealable spout for selectively accessing coconut water within a coconut having a spigot for a coconut that allows easy access by consumers to the sterile coconut water within a coconut. The spigot is comprised of a conduit having a lance on one end and a flange on the other having a through bore therebetween. A retaining ring is pro-vided as a stop for the spigot. A spigot cap is placed over the spigot and covered with a protective member. The coconut having a spigot is provided to the consumer whereby the consumer gains easy access to the sterile coconut water by pushing the partially inserted spigot to its seated position.

More particularly, the spigot of the present invention is preferably comprised of a valve seat positioned within a coconut aperture and a plunger sleeve positioned within the valve seat. The plunger sleeve has a based positioned membrane that seals the coconut aperture. A plunger-stopper is tethered to the plunger sleeve for shipping and storage and is used by the consumer to pierce the plunger sleeve membrane to gain access to the coconut water. The plunger sleeve is also used to reseal the coconut aperture to preserve any remaining coconut water for future consumption.

Further provided is an additional, preferred embodiment for a spigot comprising a conduit having a spike-tip on one end and a spout on the other with a through bore there between. The coconut having a partially inserted spigot is provided to the consumer whereby the consumer gains access to the sterile coconut water by pushing the partially inserted spigot to its seated position with a grommet provided as an insertion stop for the spigot. An optional air vent is provided to aid in fluid flow from the spigot.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the present invention.

BRIEF DESCRIPTION OF THE DRAWING FIGURES

In the drawing, wherein similar reference numerals and symbols denote similar features throughout the several views.

DETAILED DESCRIPTION

Figure 1:
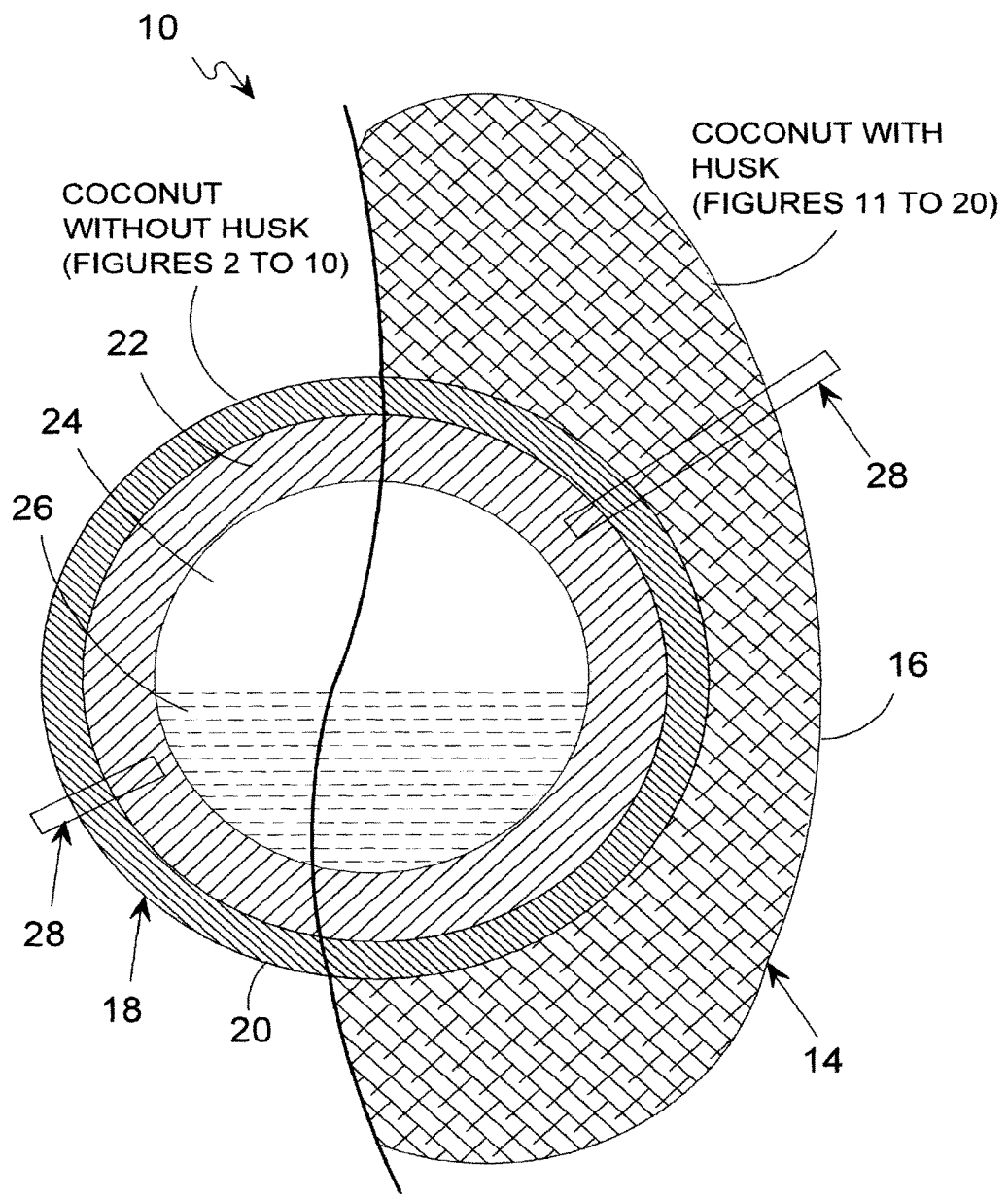
FIG. 1 is a sectional view of a coconut with and without the coconut husk providing means for accessing the coconut water when desired.

Turning now, in detail, to an analysis of the drawing figures, FIG. 1 is a sectional view of a coconut with and without the coconut husk providing means for accessing the coconut water when desired. The present invention 10 provides a spigot 28 that is partially inserted into the coconut meat 22 and then shipped to consumers who then complete inserting the spigot 28 through the coconut meat 22 into the coconut cavity 24 providing access to the sterile coconut water 26. As illustrated, the present invention provides that the spigot 28 can be used with coconuts 14 having husk 16 or with the husk removed leaving the coconut seed having coconut seed-case 20.

Figure 2:
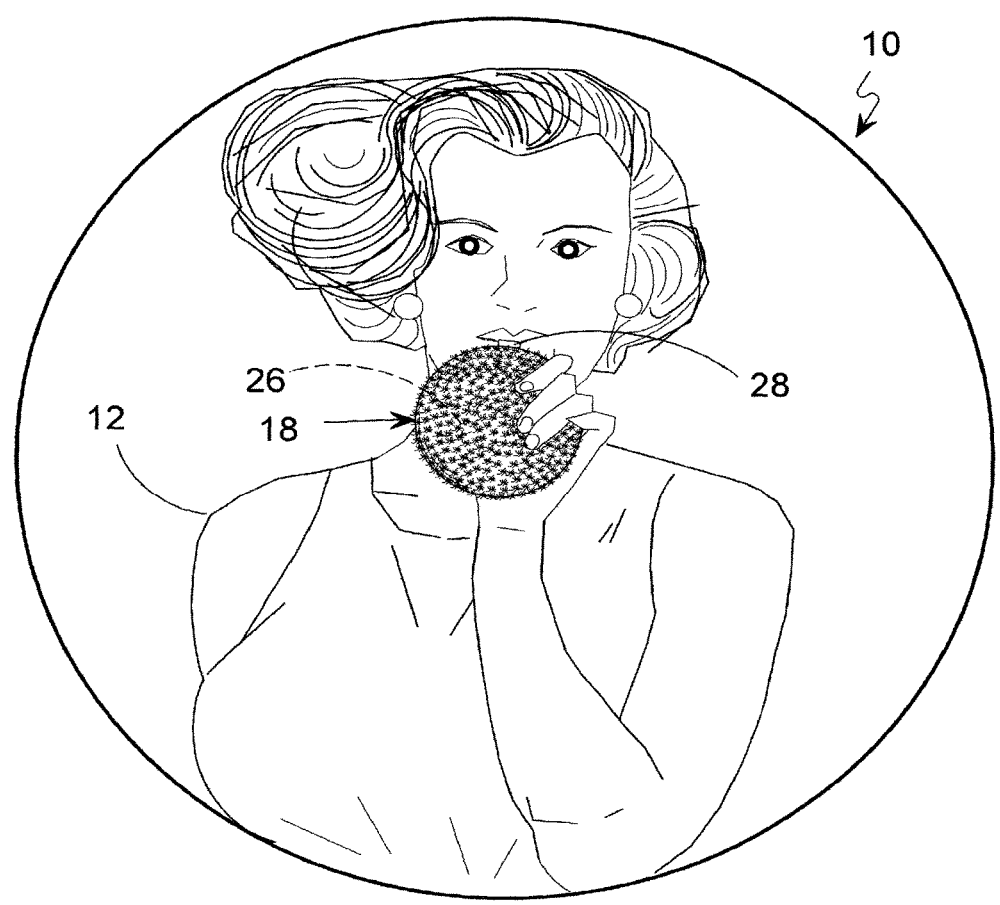
FIG. 2 is an exemplary view of the present invention in use.

FIG. 2 illustrates the present invention 10, which provides a spigot 28 that is partially imbedded into a coconut seed 18 so that a consumer 12 can gain access to the coconut water 26 by completing the insertion of the spigot 28 through the coconut meat.

Figure 3:
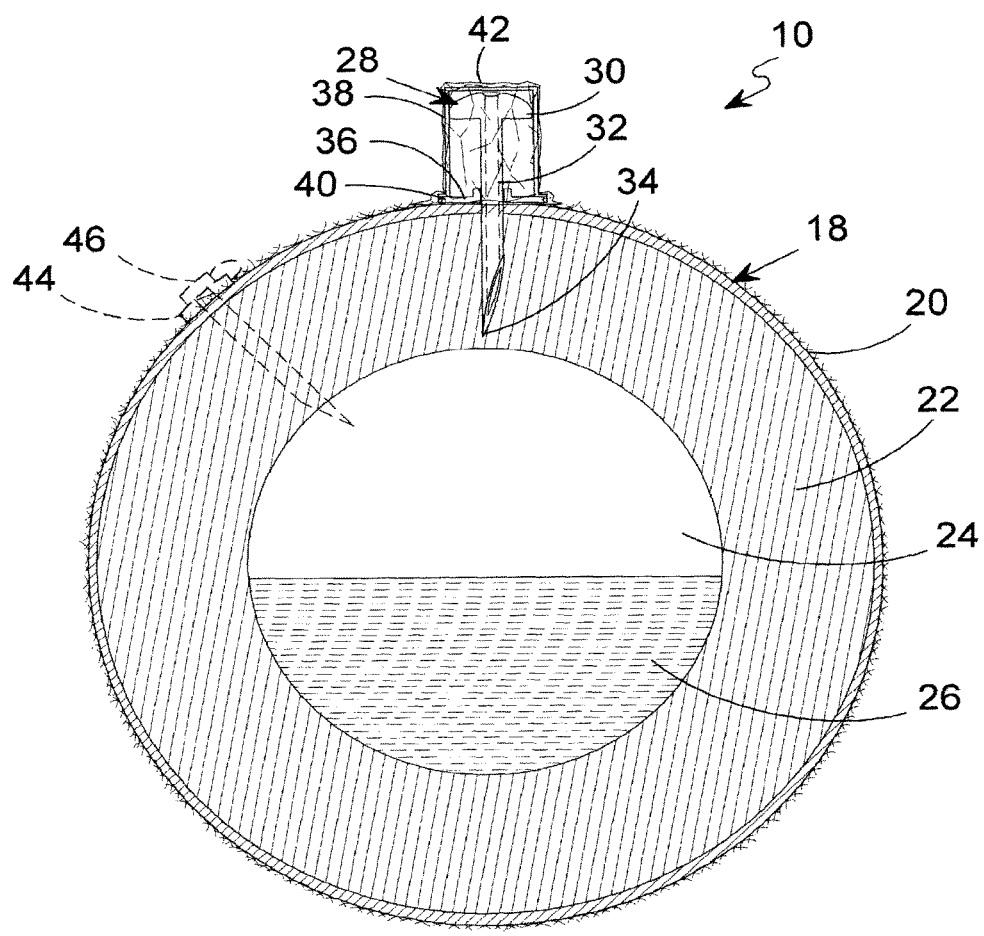
FIG. 3 is an elevational, sectional view of the coconut spigot partial inserted into a coconut.

FIG. 3 is a sectional view of the coconut spigot partial inserted into a coconut showing the present invention 10 as having means for a consumer to easily extract coconut water 26 from coconut cavity 24 by partially inserting a spigot 28 comprising spout 30, conduit 32 having spike-tip 34 through grommet 36 and coconut seed 18 having coconut seed-case 20 and into the coconut meat 22 and then covering the spigot 28 with spigot cap 38 having flange 40 frictionally engaging grommet 36 and a protective member in cap seal 42. Alternately provided is air valve 44 having tethered bung 46 for bleeding air into the coconut cavity 24 as the coconut water 26 is removed.

Figure 4:
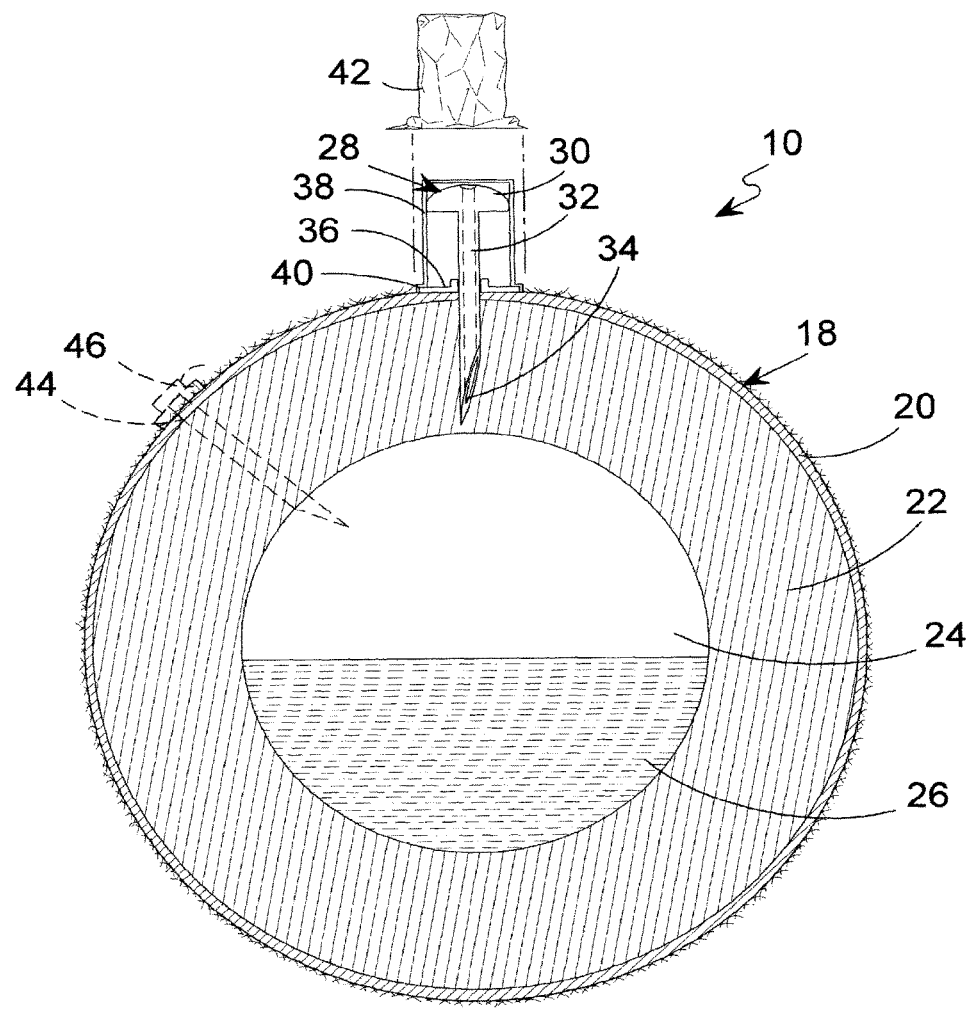
FIG. 4 is an elevational, sectional view of the coconut spigot partial inserted into a coconut.

FIG. 4 is a sectional view of the coconut spigot partial inserted into a coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water 26 from coconut cavity 24 by partially inserting spigot 28 comprising spout 30, conduit 32 having spike-tip 34 through grommet 36 and coconut seed 18 having coconut seed-case 20 and into the coconut meat 22 and then covering the spigot 28 with spout cap 38 having flange 40 frictionally engaging grommet 36 and a protective member 42. Alternately provided is air valve 44 having tethered bung 46 for bleeding air into the coconut cavity 24 as the coconut water 26 is removed.

Figure 5:
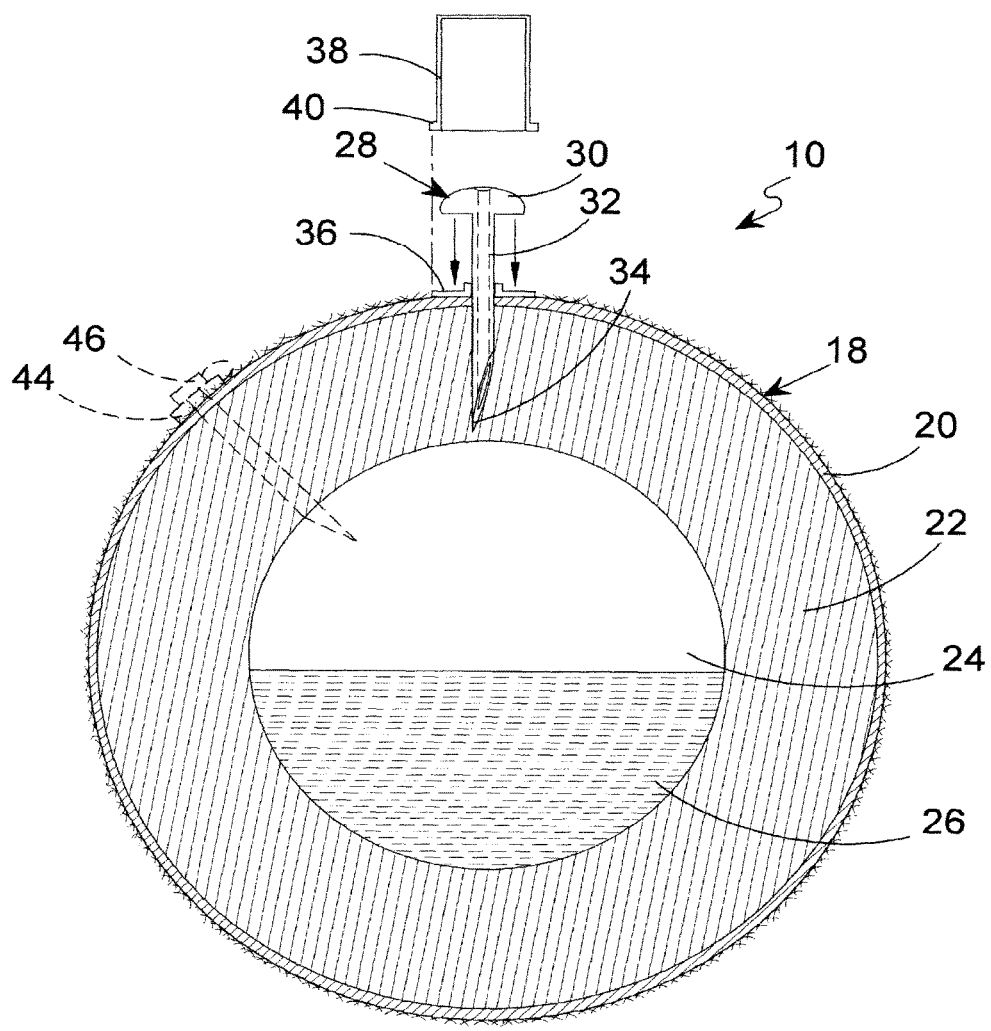
FIG. 5 is an elevational, sectional view of the coconut spigot partial inserted into a coconut with spigot cap removed.

FIG. 5 is a sectional view of the coconut spigot partial inserted into a coconut with spigot cap removed. With the cap seal removed the spigot cap 38 having flange 40 frictionally engaging grommet 36 is removed providing access to spigot 28, comprising spout 30, conduit 32 terminating in spike-tip 34 that has been positioned within coconut meat 22 of coconut seed 18 having coconut seed-case 20 wherethen the consumer can easily push spigot 28 through the remainder of coconut meat 22 into the coconut water cavity 24 thereby having access to the sterile coconut water 26. Alternately provided is air valve 44 having tethered bung 46 for bleeding air into the coconut cavity 24 as the coconut water 26 is removed.

Figure 6:
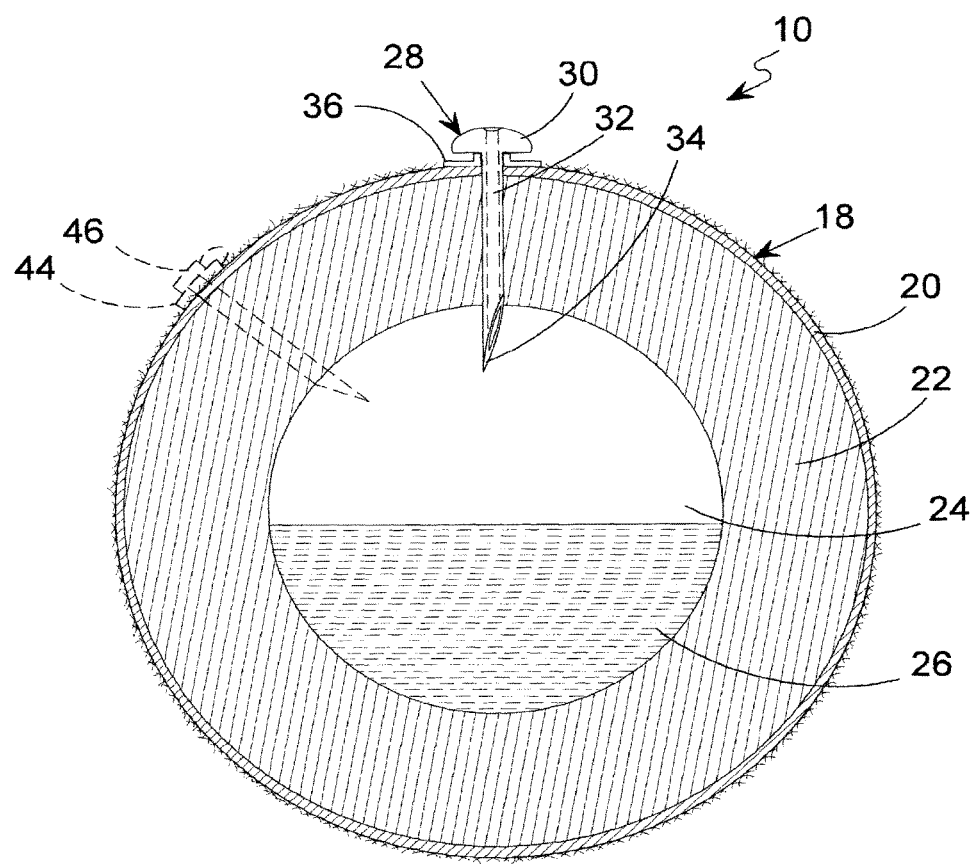
FIG. 6 is an elevational, sectional view of the coconut spigot inserted into the coconut water cavity.

FIG. 6 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut seed 18 having coconut seed-case 20 thereby providing access to coconut water 26. Grommet 36 serves as attachment for the spigot cap and as a stop for completing the insertion of spigot 28 into coconut cavity 24.

Figure 7:
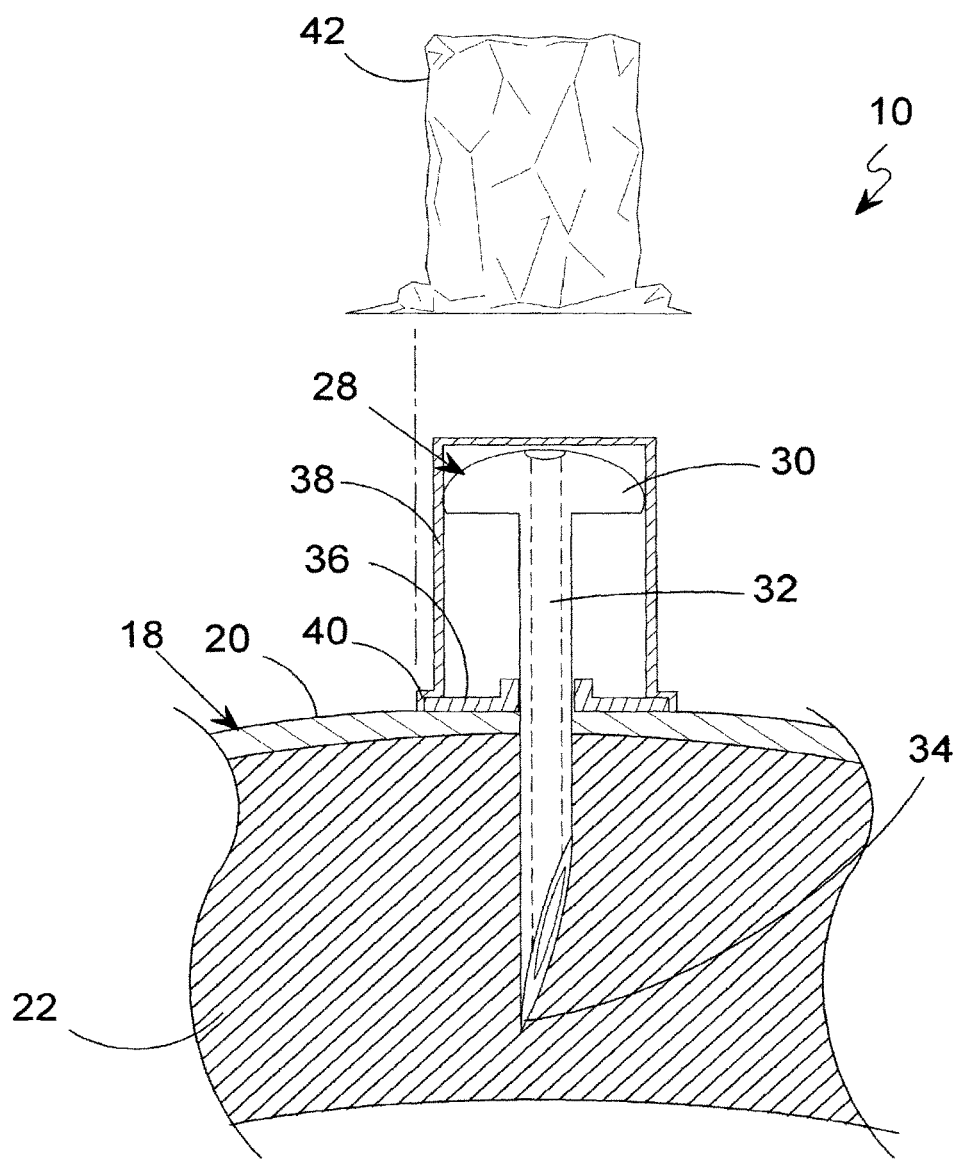
FIG. 7 is an elevational, sectional view of the coconut spigot partially inserted into the coconut.

FIG. 7 is a sectional view of the coconut spigot partially inserted into the coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water via partially inserting spigot 28 comprising spout 30, conduit 32 having spike-tip 34 through grommet 36 and coconut seed 18 having coconut seed-case 20 and into the coconut meat 22 and then covering the spigot 28 with spout cap 38 having flange 40 frictionally engaging grommet 36 and a protective member 42.

Figure 8:
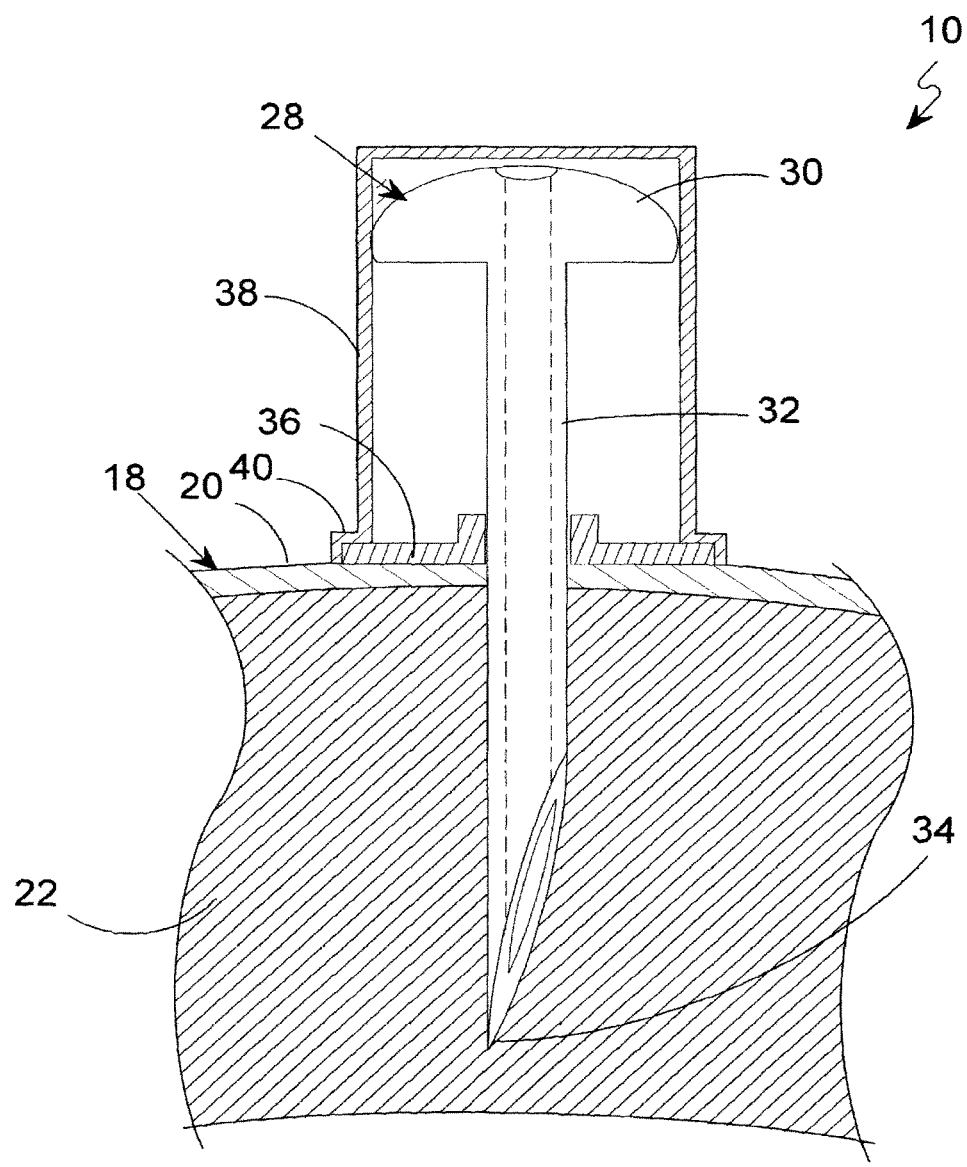
FIG. 8 is an elevational, sectional view of the coconut spigot partial inserted into a coconut.

FIG. 8 is a sectional view of the coconut spigot partial inserted into a coconut. Shown is the cap seal removed from spigot cap 38 with flange 40 fractionally engaging grommet 36 preventing casual displacement of spigot 28 during shipping and handling. Spigot 28 is comprised of spout 30 and conduit 32 terminating in spike-tip 34. Spigot 28 is inserted trough grommet 36 into coconut seed 18 having coconut seed-case 20 until spike-tip 34 is imbedded in coconut meat 22 without compromising the coconut cavity having the coconut water therein.

Figure 9:
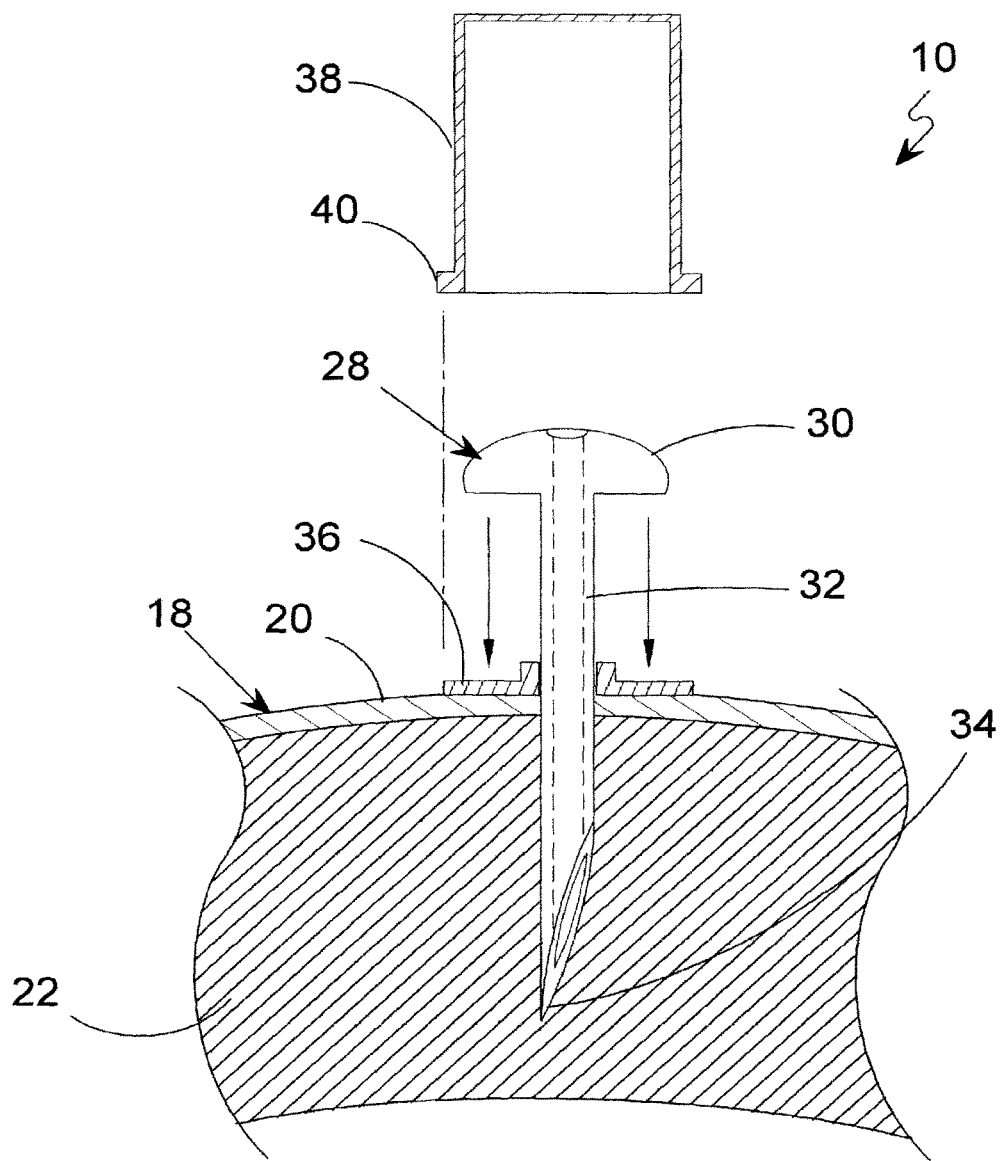
FIG. 9 is an elevational, sectional view of the coconut spigot partially inserted into the coconut.

FIG. 9 is a sectional view of the coconut spigot partially inserted into the coconut. Illustrated is the cap seal and spigot cap 38 having flange 40 removed from its frictional engagement with grommet 36 thereby providing access to spigot 28, comprising spout 30, conduit 32 terminating in spike-tip 34 that has been positioned within coconut meat 22 of coconut seed 18 having coconut seed-case 20 wherethen the consumer can easily push spigot 28 through the remainder of coconut meat 22 into the coconut water cavity to access the sterile coconut water.

Figure 10:
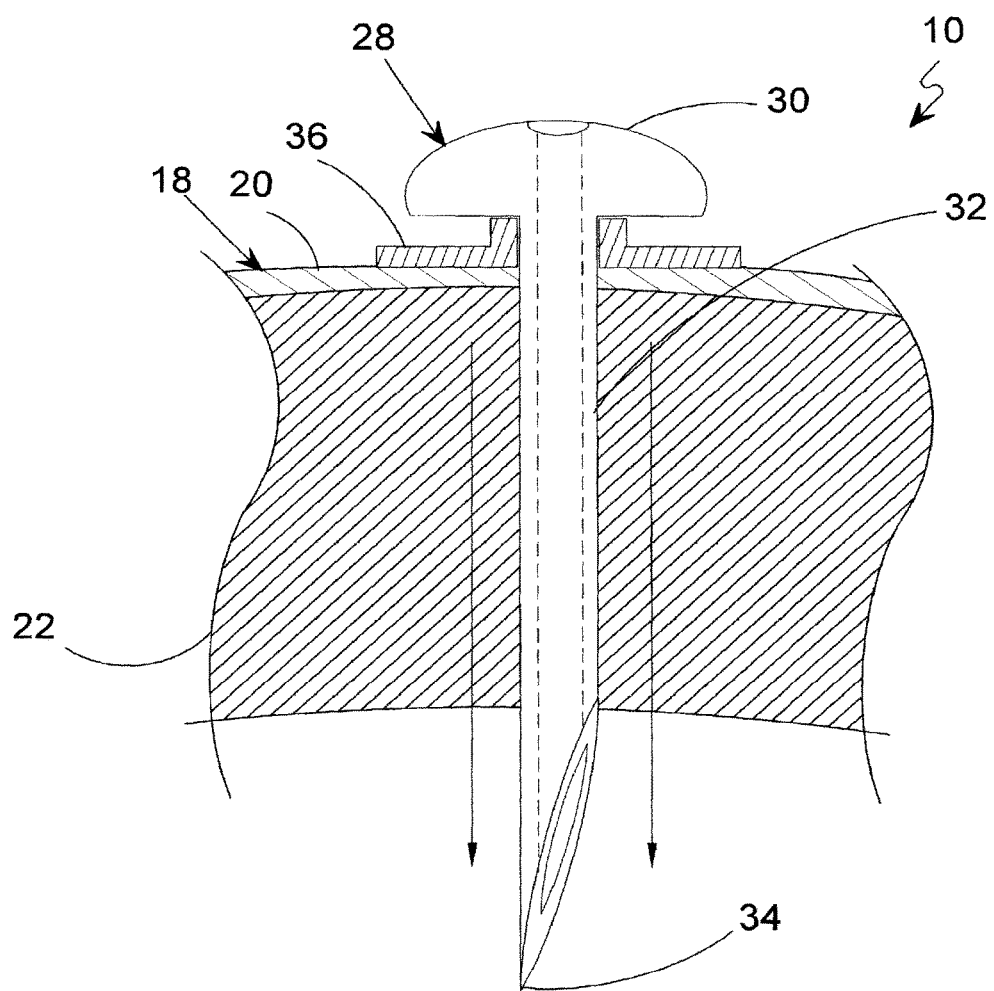
FIG. 10 is an elevational, sectional view of the coconut spigot fully inserted into the coconut cavity.

FIG. 10 is a sectional view of the coconut spigot fully inserted into the coconut cavity. Illustrated is spigot 28 comprising spout 30 and conduit 32 terminating in spike tip 34 fully inserted through coconut meat 22 into the coconut cavity of coconut seed 18 having coconut seed-case 20 thereby providing access to coconut water. Grommet 36 serves as attachment for the spigot cap and as a stop for completing the insertion of spigot 28 by the consumer into the coconut cavity.

Figure 11:
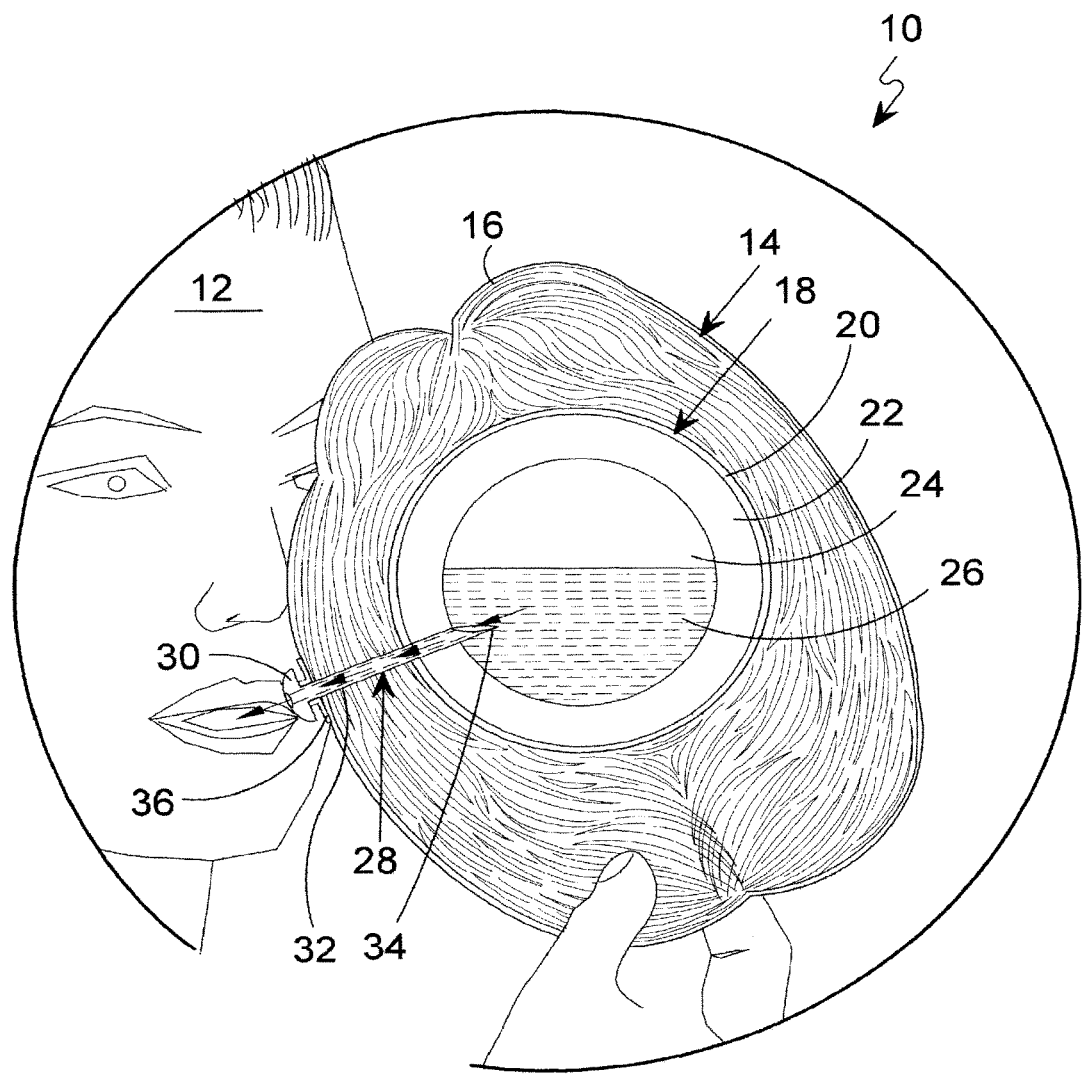
FIG. 11 is an exemplary view of the present invention in use.

FIG. 11 is an exemplary view of the present invention in use, in which the present is shown as including a spigot 28 that is partially imbedded into a coconut 14 having coconut husk 16 so that a consumer 12 can gain access to the coconut water 26 by completing the insertion of the spigot 28 through the coconut meat 22 into coconut cavity 24. Coconut 14 has coconut husk 16 encasing coconut seed 18 having seed-case 20. The present invention provides for the present invention with husk 16 or without husk 16 as previously illustrated. Grommet 32 is placed on coconut husk 16 and spigot 28 is inserted through husk 16 and coconut seed 18 having seed-case 20 into coconut meat 22 so that consumer 12 can easily complete the spigot insertion into coconut cavity 24 to access coconut water 26.

Figure 12:
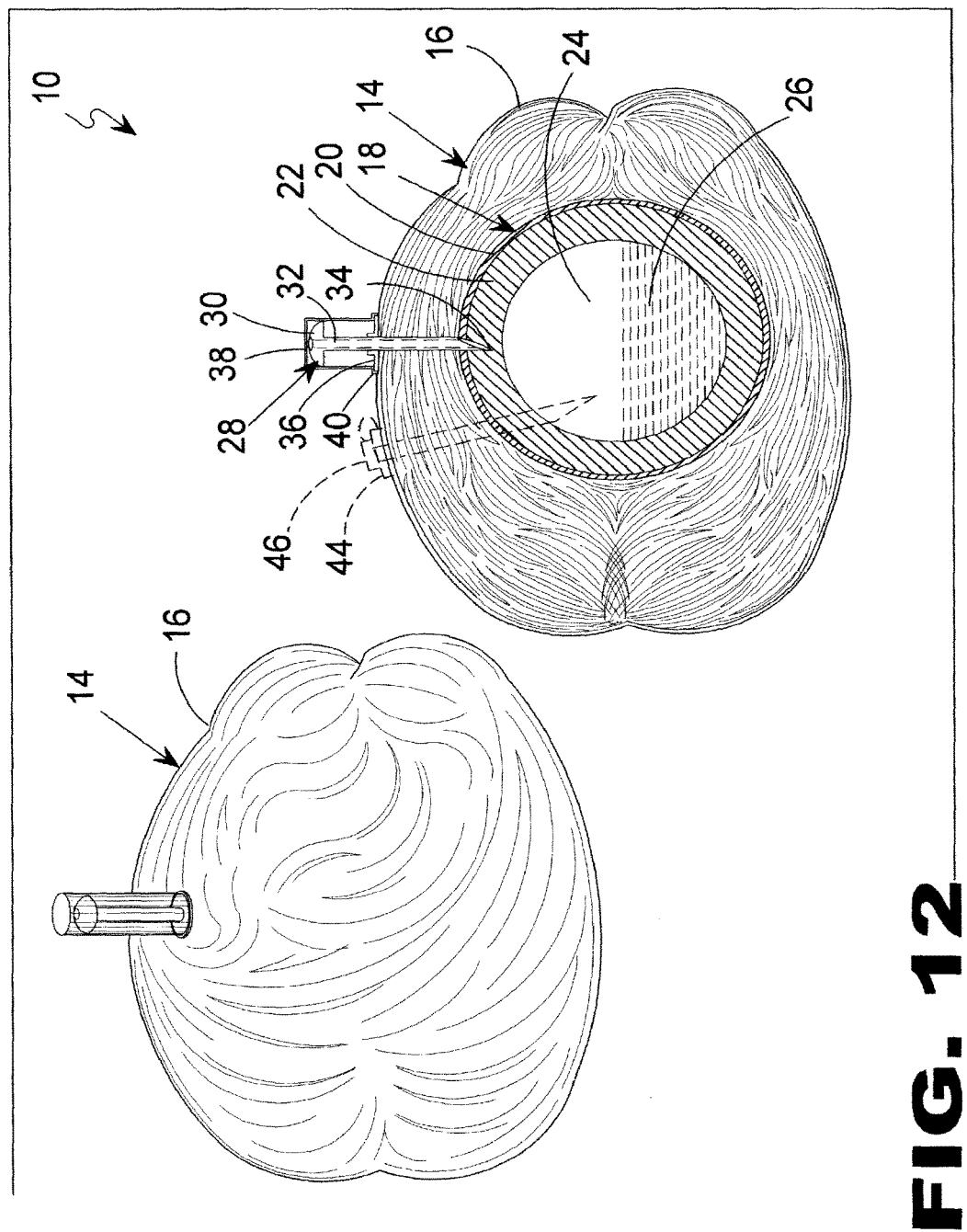
FIG. 12 is an exemplary view of the present invention in use.

FIG. 12 is an exemplary view of the present invention 10 as including means for a consumer to easily extract the coconut water 26 of coconut 14 from coconut cavity 24 by partially inserting a spigot 28 comprising spout 30, conduit 32 having spike-tip 34 through grommet 36, coconut husk 16, coconut seed 18 having coconut seed-case 20 and into the coconut meat 22 and then covering spigot 28 with spigot cap 38 having flange 40 frictionally engaging grommet 36 and a cap seal. Alternately provided is air valve 44 having tethered bung 46 for bleeding air into the coconut cavity 24 as the coconut water 26 is removed.

Figure 13:
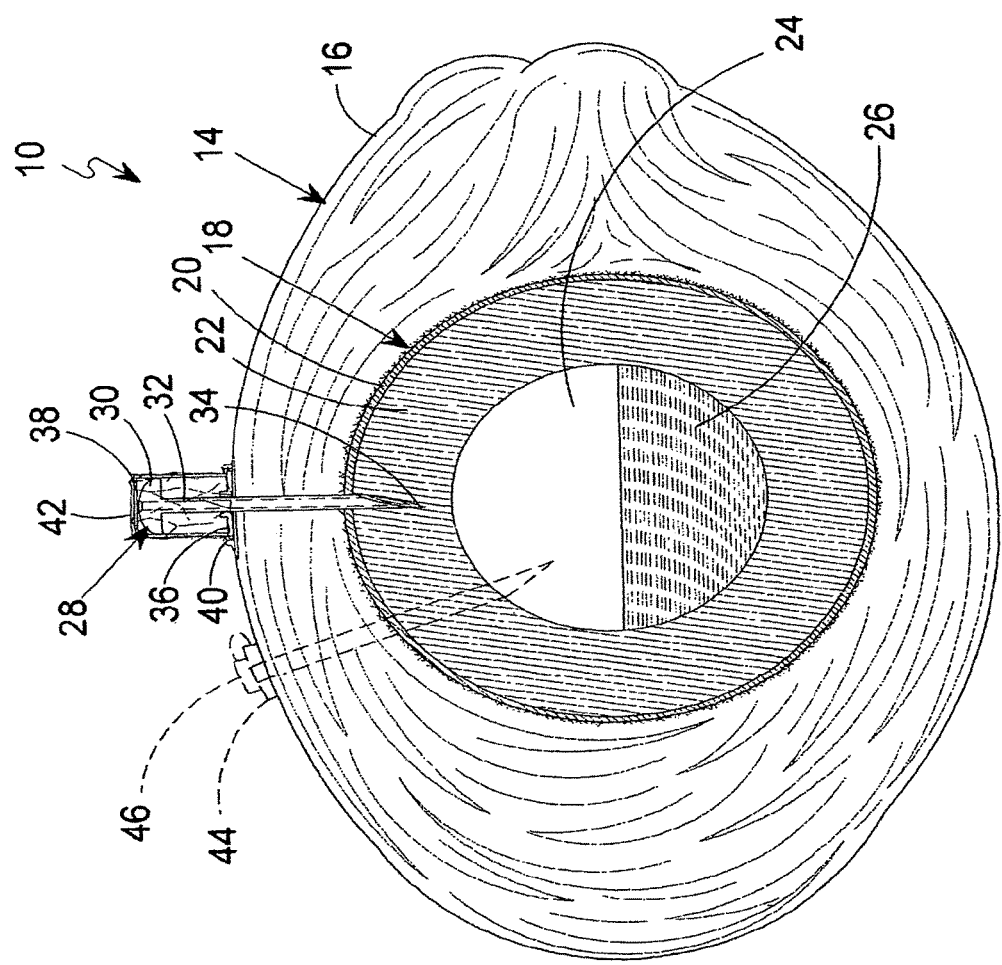
FIG. 13 is an elevational, sectional view of the coconut spigot partial inserted into a coconut.

FIG. 13 is a sectional view of the coconut spigot partial inserted into a coconut. The present invention 10 provides means for a consumer to easily extract coconut water 26 from coconut 14 having husk 16 by partially inserting a spigot 28 comprising spout 30, conduit 32 having spike-tip 34 through grommet 36, coconut husk 16 and coconut seed 18 having coconut seed-case 20 and into the coconut meat 22 and then covering the spigot 28 with spigot cap 38 having flange 40 frictionally engaging grommet 36 and a protective member in cap seal 42. Alternately provided is air valve 44 having tethered bung 46 for bleeding air into the coconut cavity 24 as the coconut water 26 is removed.

Figure 14:
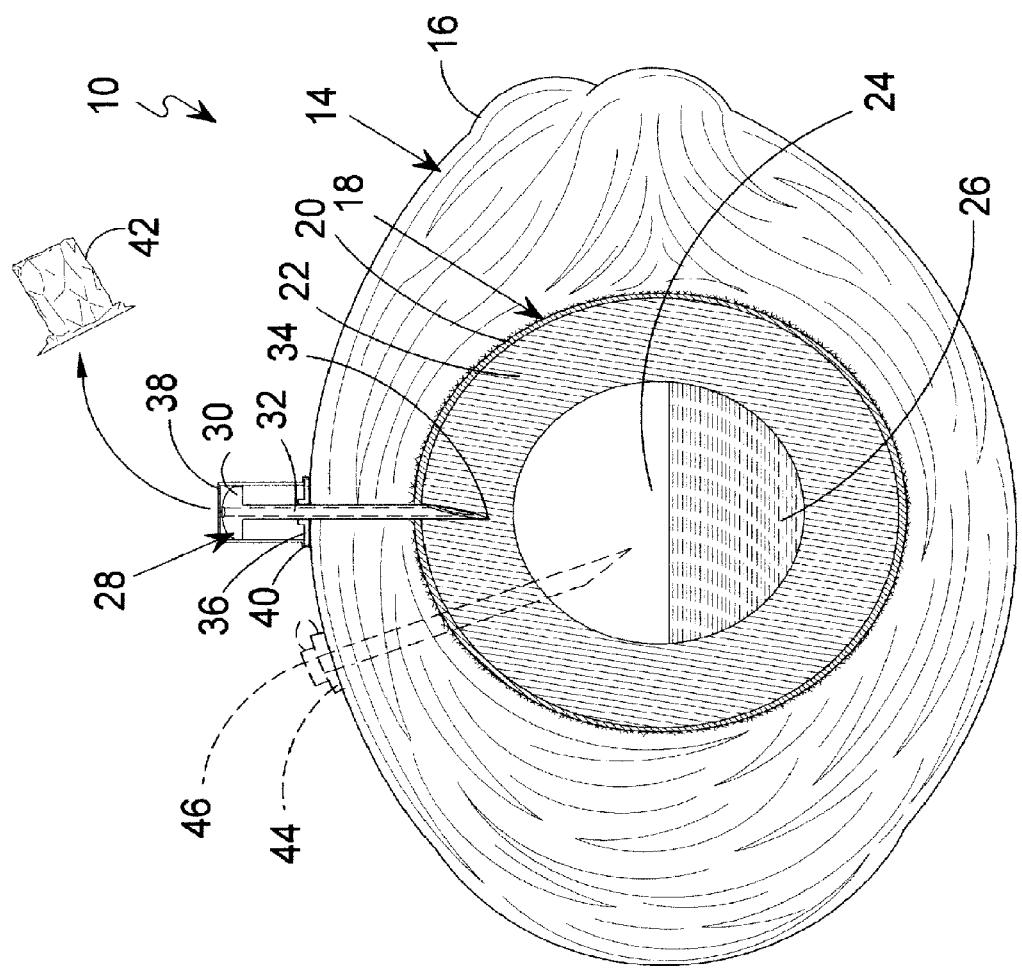
FIG. 14 is an elevational, sectional view of the coconut spigot partial inserted into a coconut.

FIG. 14 is a sectional view of the coconut spigot partial inserted into a coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water 26 from coconut cavity 24 by partially inserting spigot 28 comprising spout 30, conduit 32 having spike-tip 34 through grommet 36 into coconut 14 having coconut husk 16 and coconut seed 18 having coconut seed-case 20 and into the coconut meat 22 and then covering the spigot 28 with spout cap 38 having flange 40 frictionally engaging grommet 36 and a protective member 42. Alternately provided is air valve 44 having tethered bung 46 for bleeding air into the coconut cavity 24 as the coconut water 26 is removed.

Figure 15:
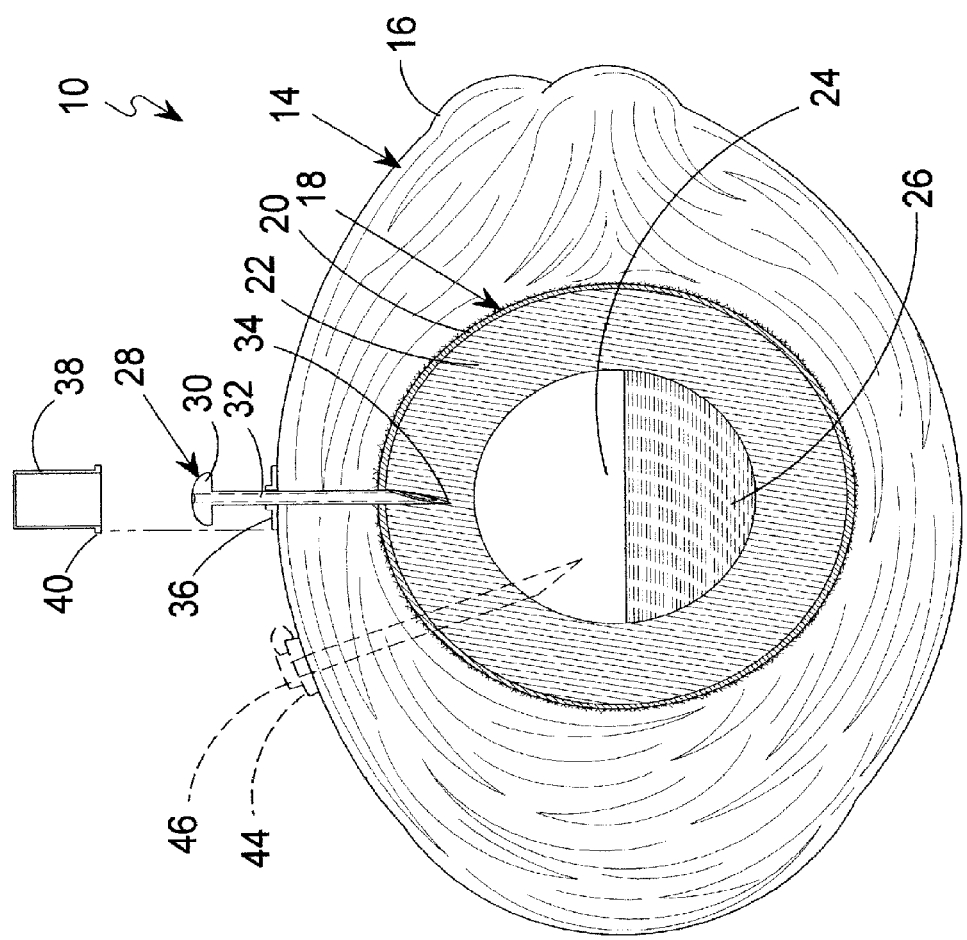
FIG. 15 is an elevational, sectional view of the coconut spigot partial inserted into a coconut with cap removed.

FIG. 15 is a sectional view of the coconut spigot partial inserted into a coconut with cap removed. With the cap seal removed the spigot cap 38 having flange 40 frictionally engaging grommet 36 is removed providing access to spigot 28, comprising spout 30, conduit 32 terminating in spike-tip 34 that has been positioned within coconut meat 22 of coconut 14 having husk 16 and coconut seed 18 having coconut seed-case 20 wherethen the consumer can easily push spigot 28 through the remainder of coconut meat 22 into the coconut water cavity 24 thereby having access to the sterile coconut water 26. Alternately provided is air valve 44 having tethered bung 46 for bleeding air into the coconut cavity 24 as the coconut water 26 is removed.

Figure 16:
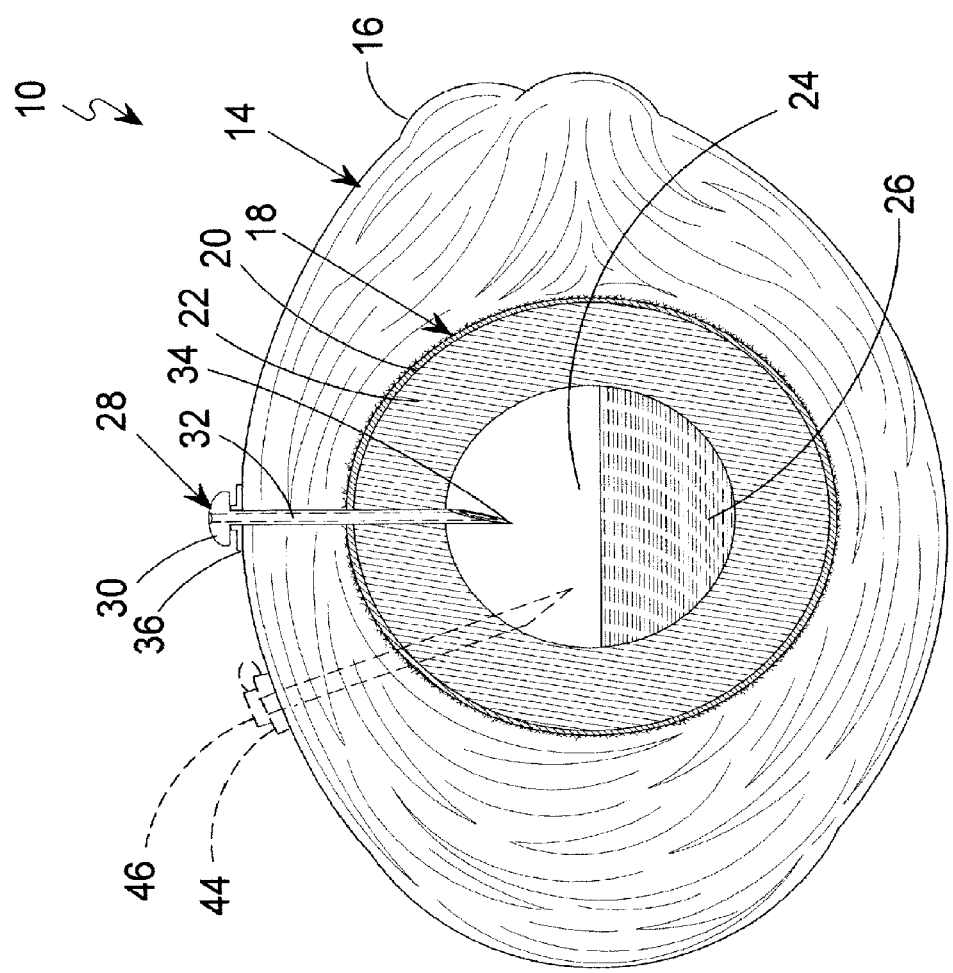
FIG. 16 is an elevational, sectional view of the coconut spigot inserted into the coconut water cavity.

FIG. 16 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut 14 having husk 16 encompassing coconut seed 18 having coconut seed-case 20 thereby providing access to coconut water 26. Grommet 36 serves as attachment for the spigot cap and as a stop for completing the insertion of spigot 28 into coconut cavity 24.

Figure 17:
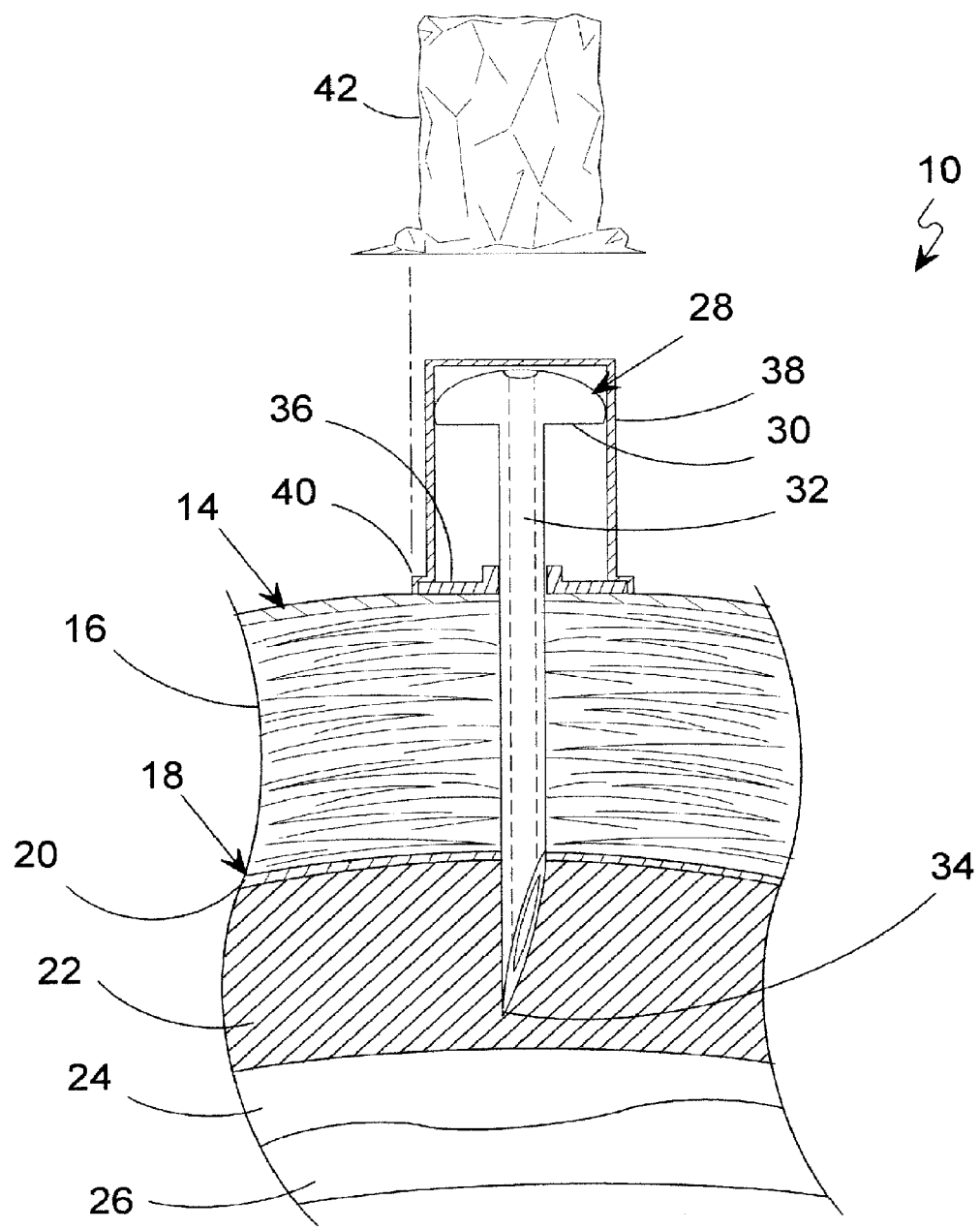
FIG. 17 is an elevational, sectional view of the coconut spigot partially inserted into the coconut.

FIG. 17 is a sectional view of the coconut spigot partially inserted into the coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water via partially inserting spigot 28 comprising spout 30, conduit 32 having spike-tip 34 positioned through grommet 36 situated on coconut 14 husk 16 encompassing coconut seed 18 having coconut seed-case 20 and into the coconut meat 22 and then covering the spigot 28 with spout cap 38 having flange 40 frictionally engaging grommet 36 and covered by cap seal 42.

Figure 18:
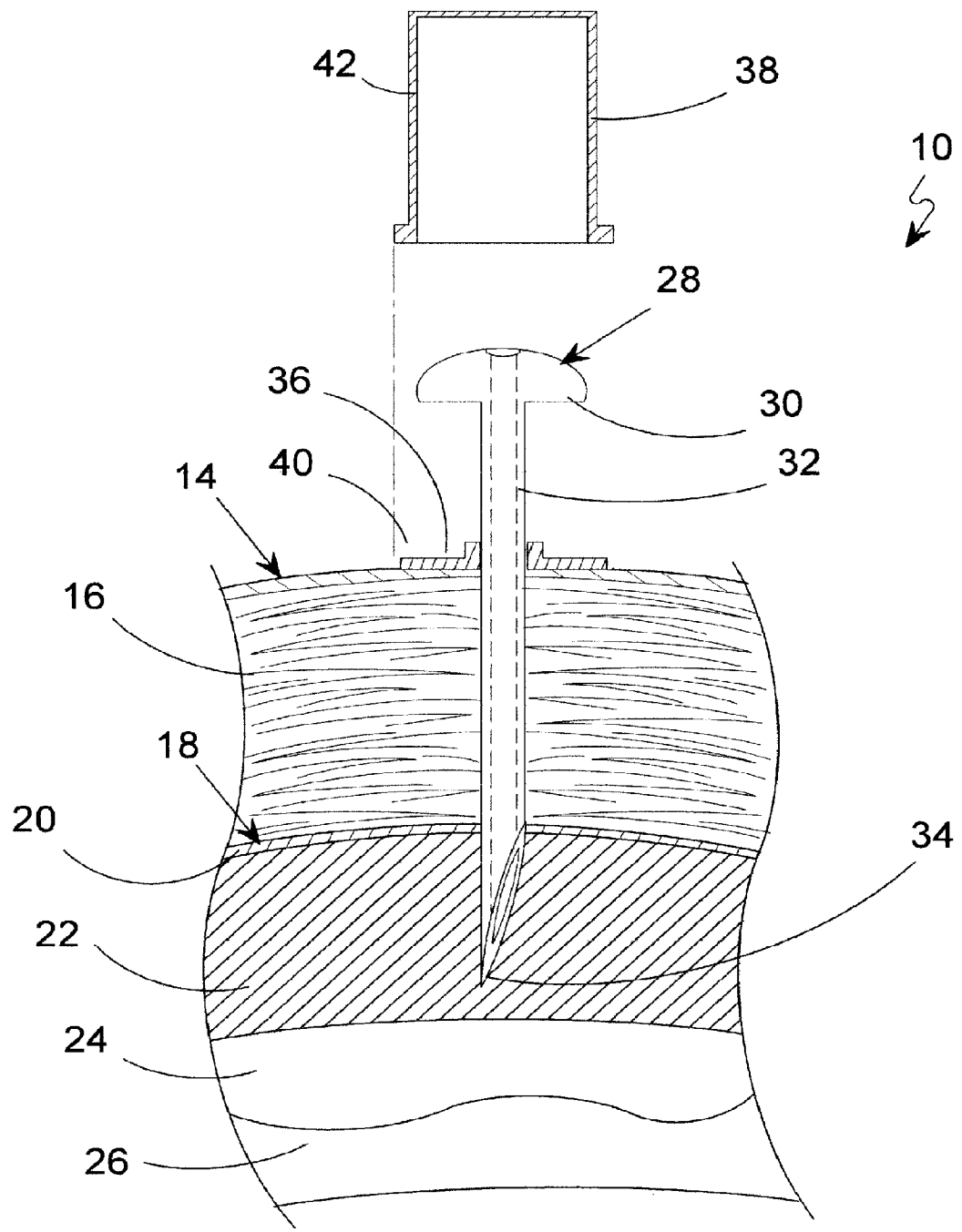
FIG. 18 is an elevational, sectional view of the coconut spigot partially inserted into the coconut.

FIG. 18 is a sectional view of the coconut spigot partially inserted into the coconut. Illustrated is the cap seal and spigot cap 38 having flange 40 removed from its factional engagement with grommet 36 thereby providing access to spigot 28, comprising spout 30, conduit 32 terminating in spike-tip 34 that has been positioned within coconut meat 22 of coconut 14 having husk 16 encompassing coconut seed 18 having coconut seed-case 20 where then the consumer can easily push spigot 28 through the remainder of coconut meat 22 into the coconut water cavity to access the sterile coconut water.

Figure 19:
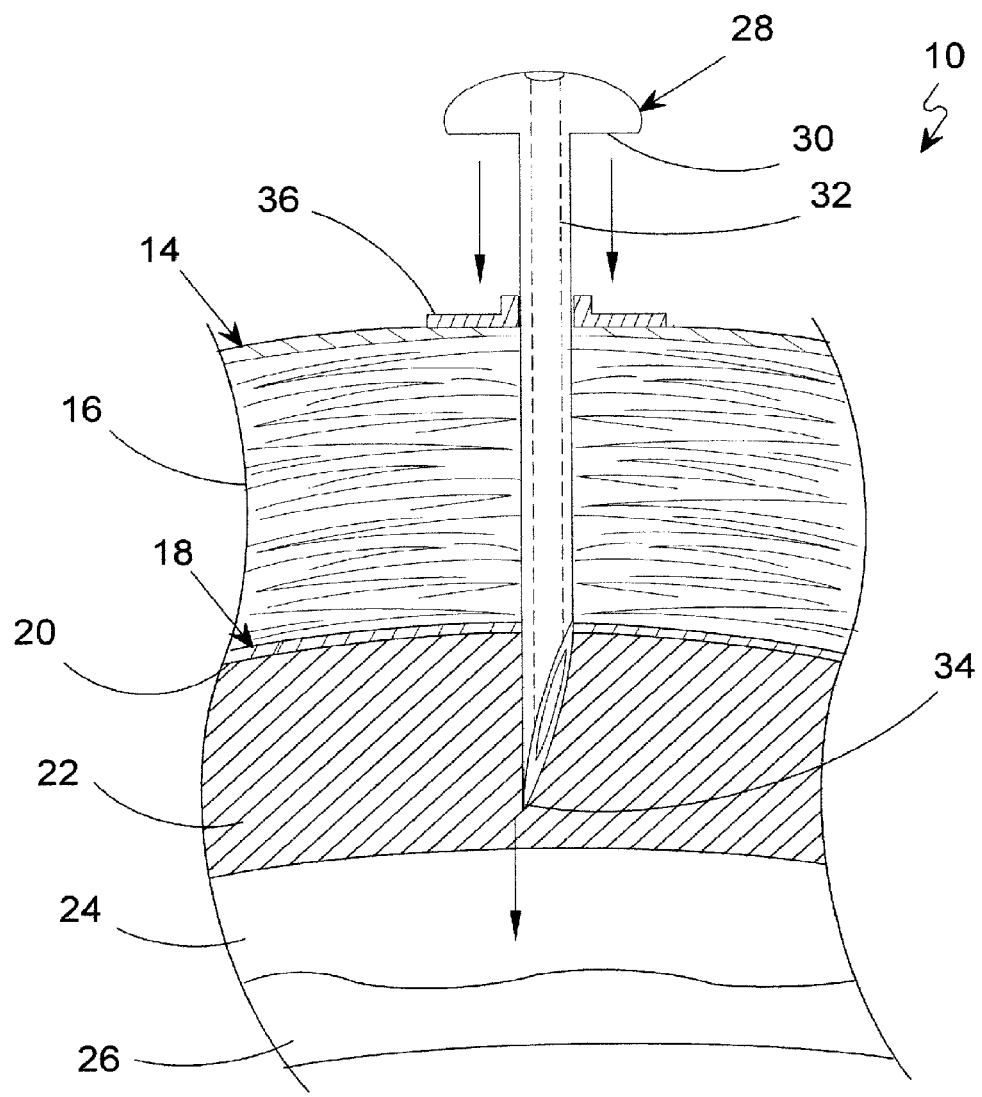
FIG. 19 is an elevational, sectional view of the coconut spigot partially inserted into the coconut.

FIG. 19 is a sectional view of the coconut spigot partially inserted into the coconut. Illustrated is the cap seal and spigot cap 38 having flange 40 removed from its factional engagement with grommet 36 thereby providing access to spigot 28, comprising spout 30, conduit 32 terminating in spike-tip 34 that has been positioned within coconut meat 22 of coconut 14 having husk 16 encompassing seed 18 having coconut seed-case 20 wherethen the consumer can easily push spigot 28 through the remainder of coconut meat 22 into the coconut water cavity to access the sterile coconut water.

Figure 20:
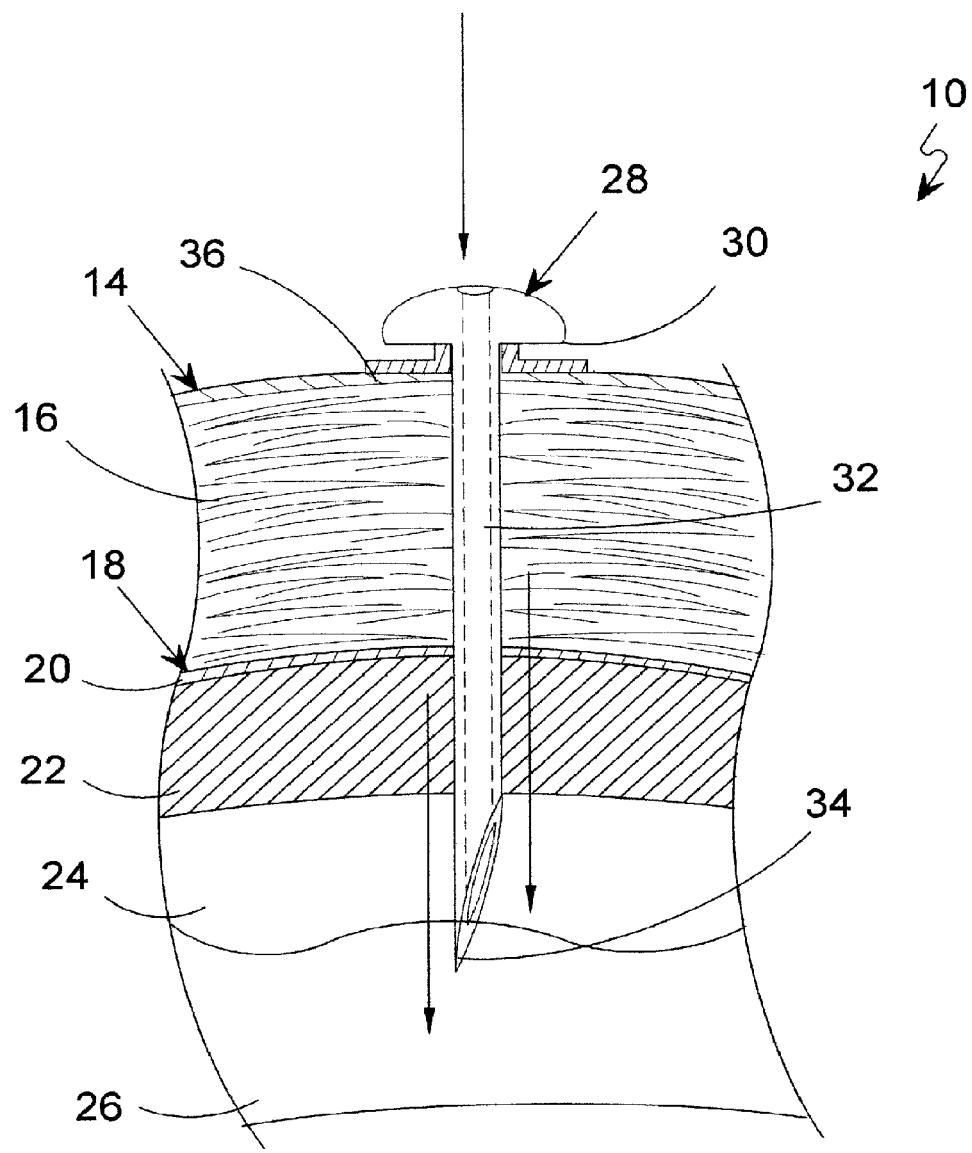
FIG. 20 is an elevational, sectional view of the coconut spigot fully inserted into the coconut cavity.

FIG. 20 is a sectional view of the coconut spigot fully inserted into the coconut cavity. Illustrated is spigot 28 comprising spout 30 and conduit 32 terminating in spike-tip 34 fully inserted through coconut meat 22 into the coconut cavity of coconut 14 having coconut husk 16 encompassing coconut seed 18 having coconut seed-case 20 thereby providing access to coconut water. Grommet 36 serves as attachment for the spigot cap and as a stop for completing the insertion of spigot 28 into the coconut cavity.

Figure 21:
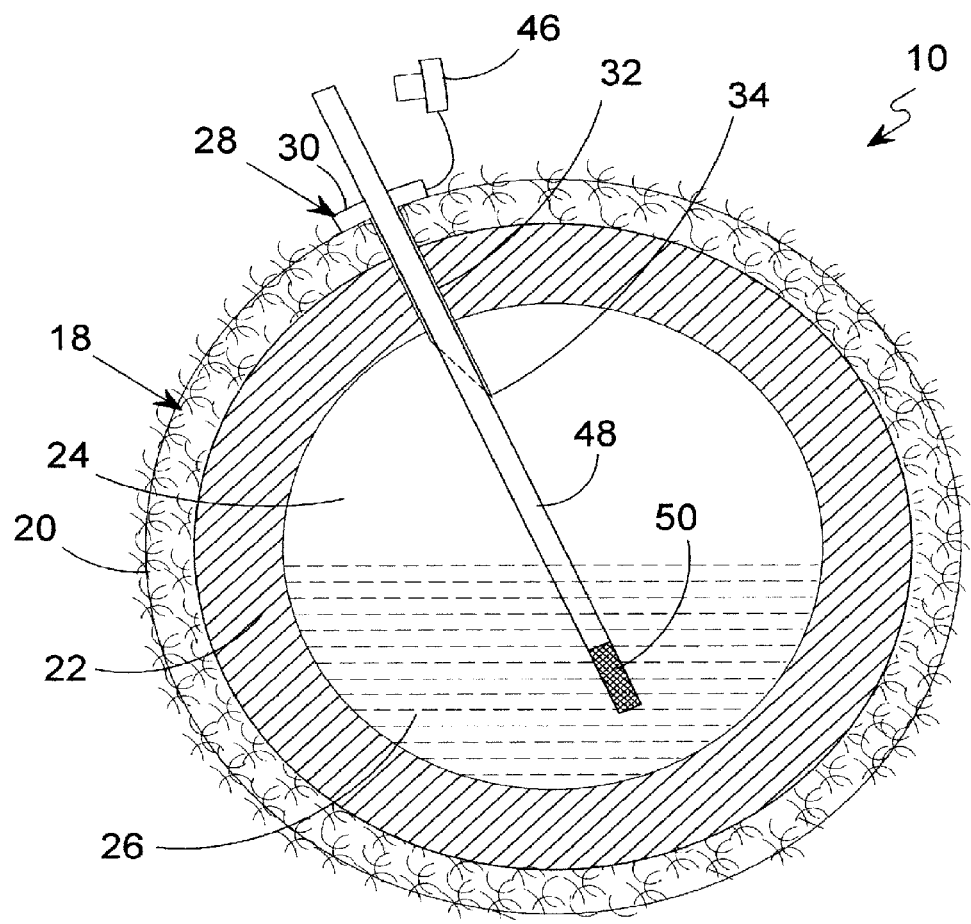
FIG. 21 is an elevational, sectional view of the coconut spigot inserted into the coconut water cavity.

FIG. 21 is a sectional view of an additional element comprising closable grommet and straw. The present invention 10 alternately provides for spigot 28 having spout 30 with closable bung 46, conduit 32 terminating in spike-tip 34 placed through grommet 36 and coconut seed 18 having coconut seed-case 20 through coconut meat 22 and into coconut cavity 24 where then the consumer can extract the coconut water through straw 48 having filter 50 to prevent pulp from being drawn into the straw.

Figure 22:
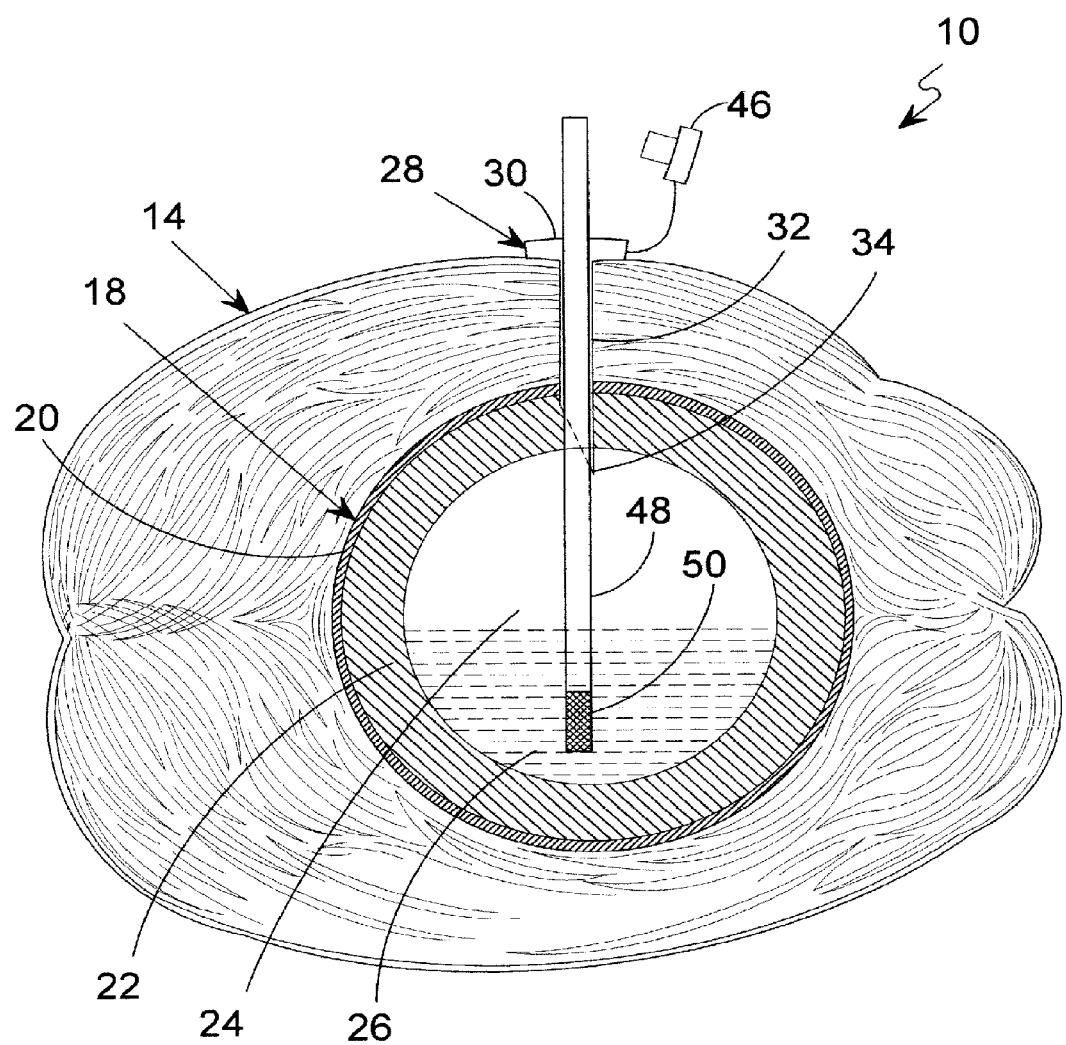
FIG. 22 is an elevational, sectional view of the coconut spigot inserted into the coconut water cavity.

FIG. 22 is a sectional view of an additional element comprising closable grommet and straw. The present invention 10 also provides for spigot 28 having spout 30 with closable bung 46, conduit 32 terminating in spike-tip 34 placed through grommet 36 positioned on coconut 14 having husk 16 encompassing coconut seed 18 having coconut seed-case 20 through coconut meat 22 and into coconut cavity 24 where then the consumer can extract the coconut water through straw 48 having filter 50 to prevent pulp from being drawn into the straw.

Figure 23:
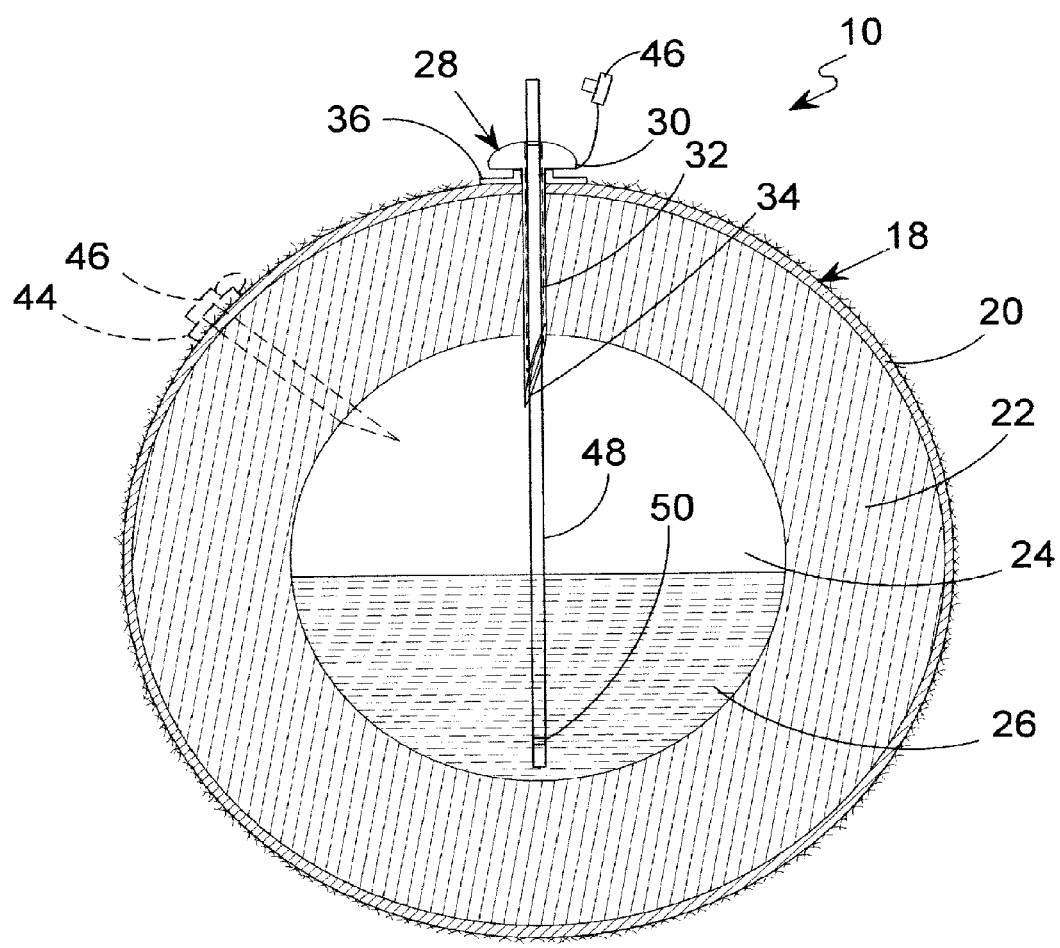
FIG. 23 is an elevational, sectional view of a coconut having a straw with slits and a closed end.

FIG. 23 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut seed 18 having coconut seed-case 20 thereby providing access to coconut water 26 via straw 48 having filter 50. Grommet 36 serves as attachment for the spigot cap and as a stop for completing the insertion of spigot 28 into coconut cavity 24 with bung 46 serving as closure to keep any unconsumed coconut fresh.

Figure 24:
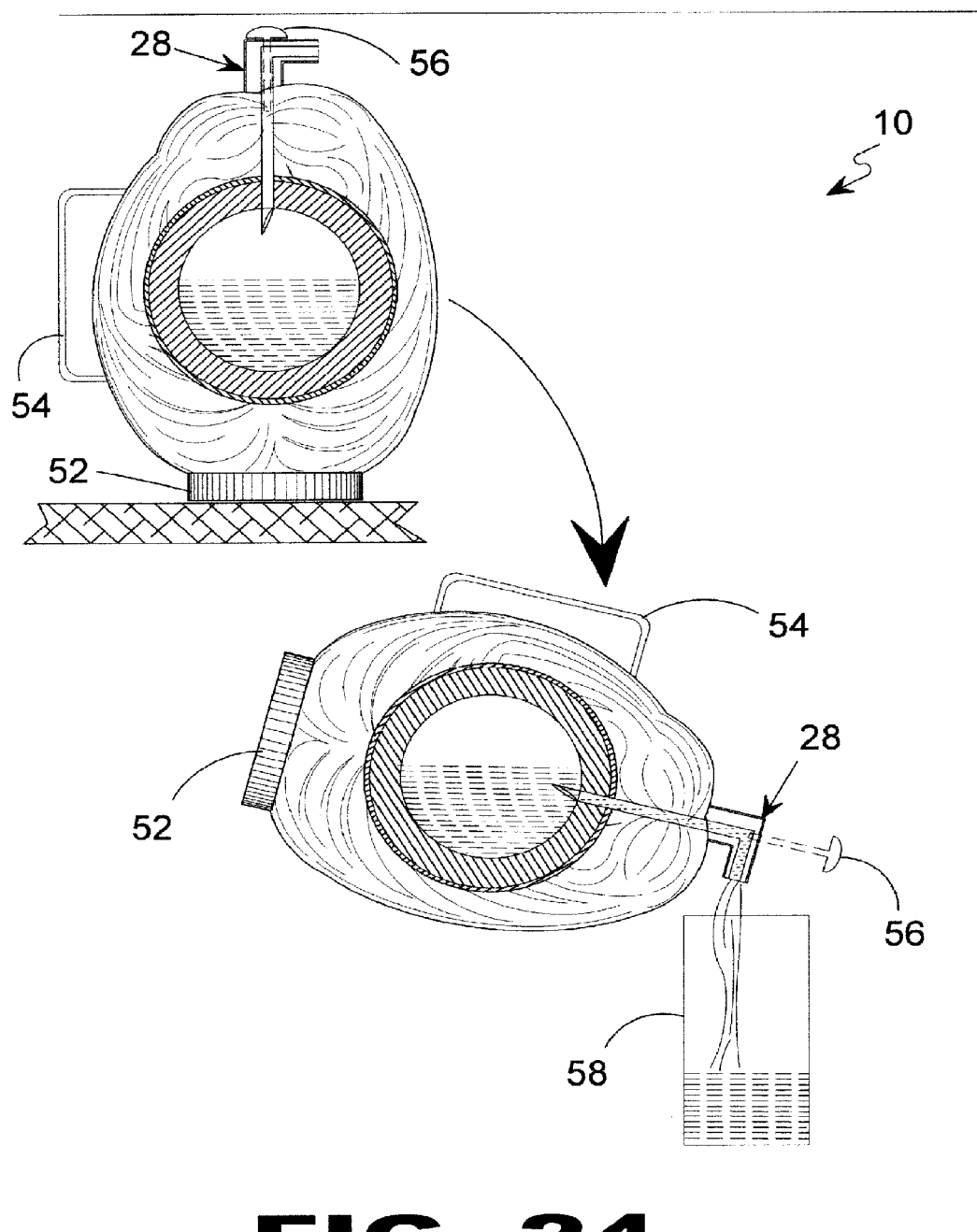
FIG. 24 is an exemplary view of a stand and handle for a coconut.

FIG. 24 is an illustrative view of additional elements of the present invention. More particularly, the present invention 10 provides for a coconut stand 52 and coconut handle 54 as a convenience for accessing the coconut water. Further provided is spigot 28 having a plunger 56 that seals spigot 28 to keep the coconut water fresh until the plunger is selectively removed from the spigot conduit where then the consumer can dispenses the coconut water into glass 58.

Figure 25:
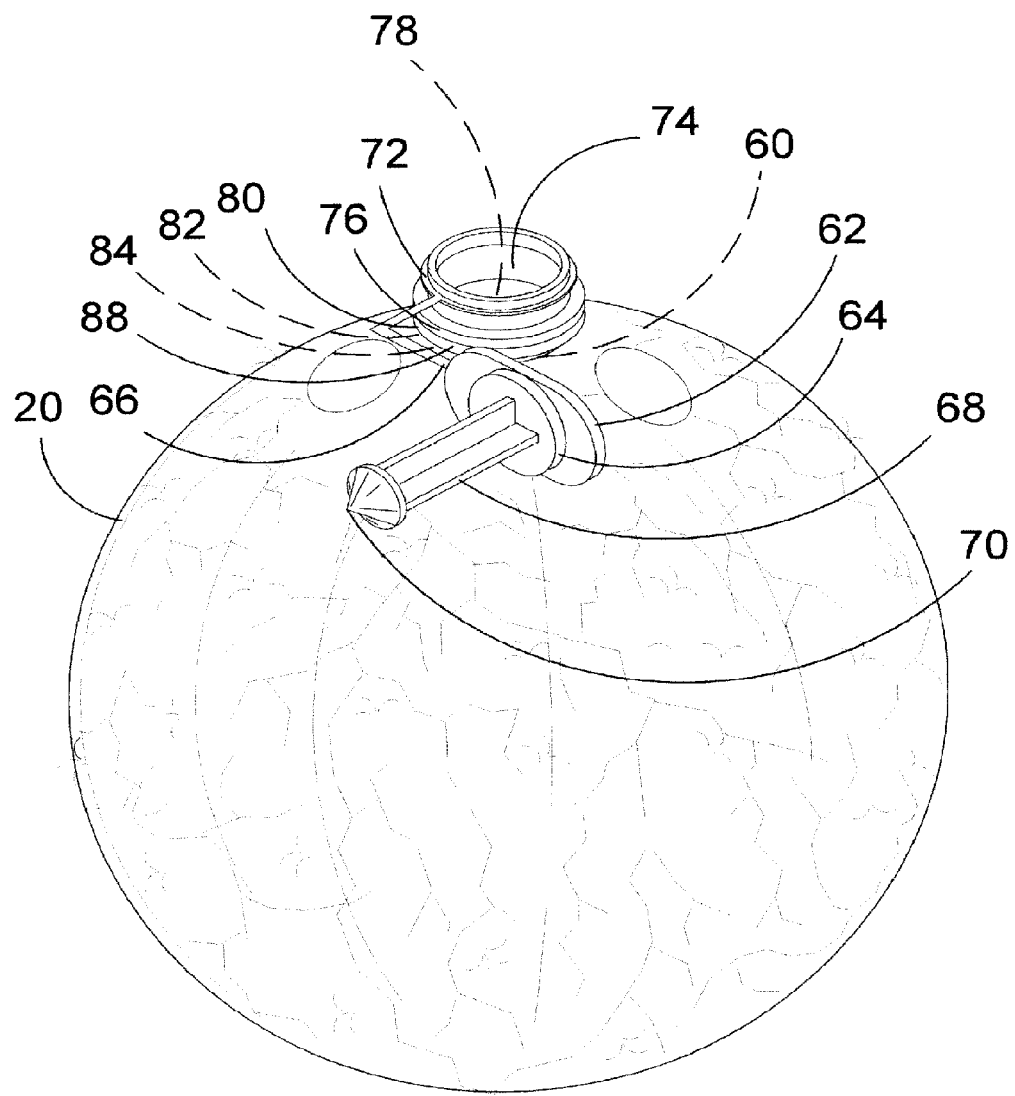
FIG. 25 is a prospective, exemplary of an alternate preferred embodiment of the present invention.

FIG. 25 is an illustrative view of an alternate preferred embodiment of the present invention. Shown is coconut 20 having aperture 60 placed within the wall having a predetermined diameter so that valve plug 80 seats within said aperture with valve plug collar 82 substantially engaging the wall of aperture 60. Valve plug 80 has valve plug bore 84 for receiving plunger sleeve 72 having plunger sleeve bore 74 with a based positioned plunger sleeve membrane 78 that seals the coconut's contents until plunger stopper 62 having plunger-stopper lance 68 and plunger-stopper lance tip 70 is used to puncture plunger sleeve membrane 78 thereby providing access to the coconut water contained within the coconut. Plunger-stopper 62 is tethered via 66 to plunger sleeve 72. The plunger-stopper 72 serves to provide access to the coconut's contents and also serves as stopper to seal any remaining coconut contents for future use by providing plunger-stopper 64 that seals plunger sleeve bore 74.

Figure 26:
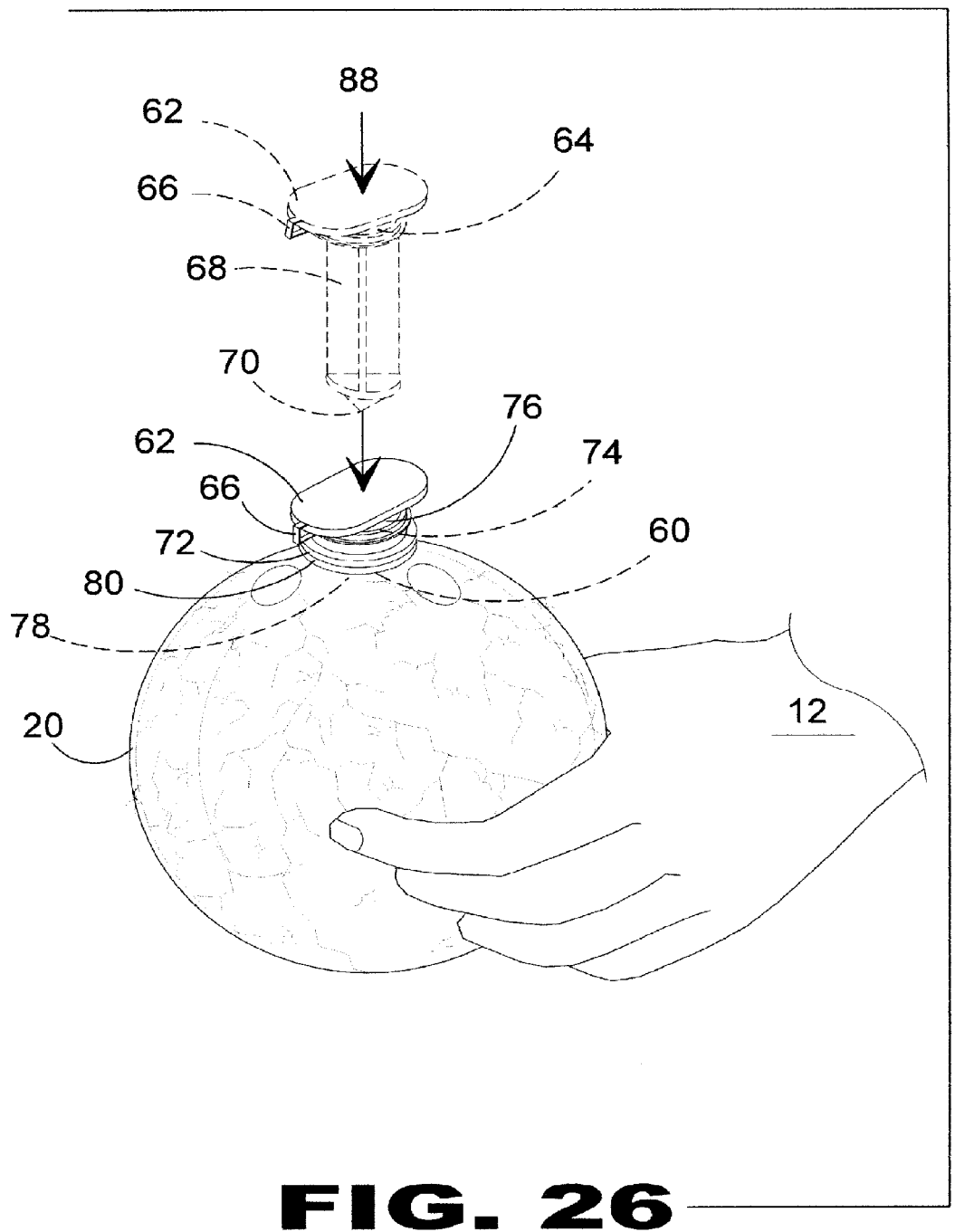
FIG. 26 is a prospective, exemplary view of the plunger-stopper providing access to the coconut water.

FIG. 26 is an illustrative view of the plunger-stopper providing access to the coconut water. Coconut 20 has a tooled aperture 60 placed through the seed wall having a predetermined diameter so that valve plug 80 can be pressed into said aperture so that the valve plug collar 82 engages the top periphery wall of said coconut aperture 60 while the valve plug flange engages the interior periphery wall of said coconut aperture 60. Plunger sleeve 72 is seated within valve plug bore 84, shown in FIG. 30, having a base positioned plunger sleeve membrane 78 that seals the coconut's contents.

Figure 27:
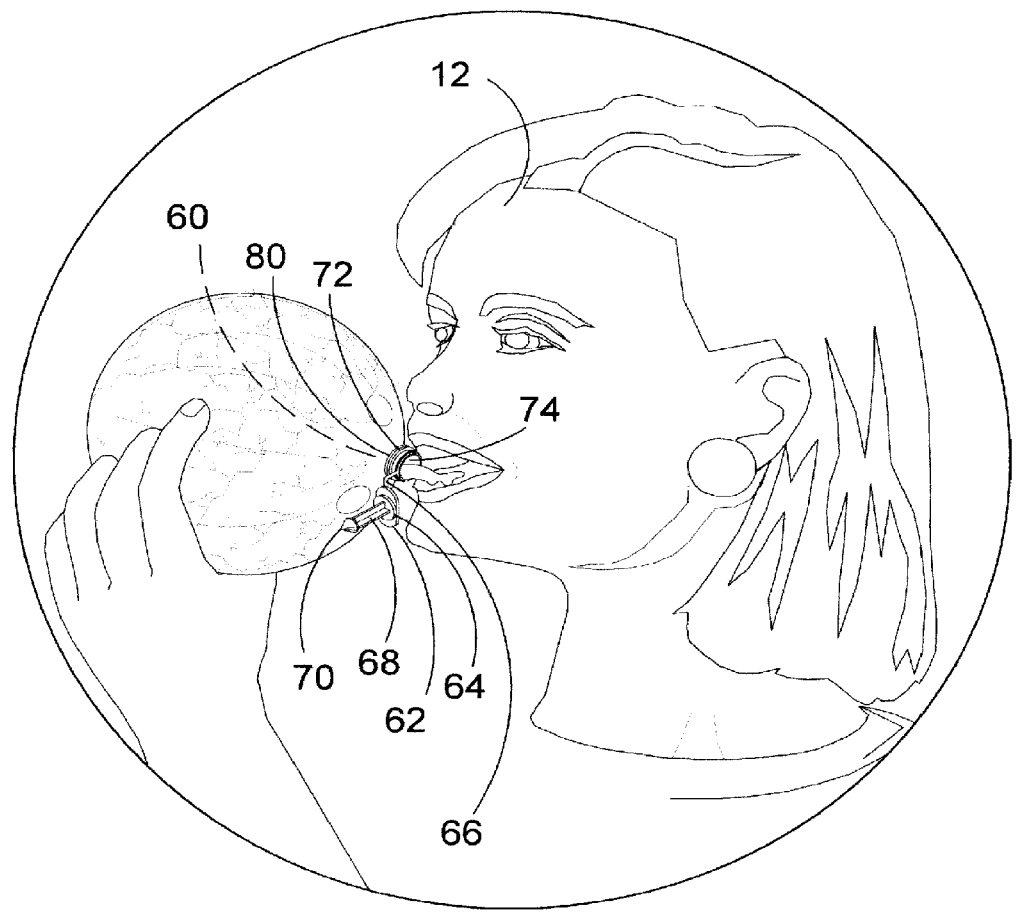
FIG. 27 is an elevational, exemplary view of the resealable spout in use.

FIG. 27 is an illustrative view of the resealable spout in use. The coconut water can be selectively accessed by user 12 once membrane 78 has been punctured using plunger-stopper tip 70. Plunger-stopper 62 also provides collar 64 having similar diameter as plunger sleeve bore 74 so that the bore spout can be resealed to preserve any remaining coconut water for future consumption.

Figure 28:
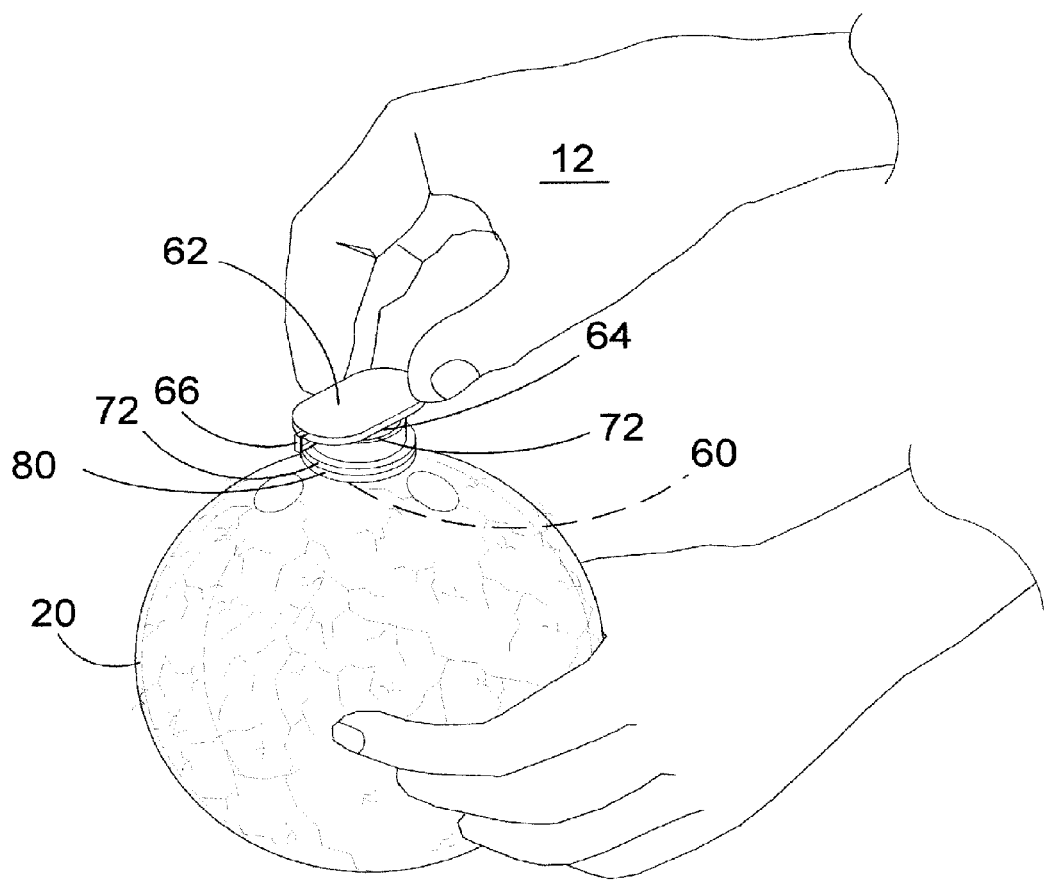
FIG. 28 is a prospective, exemplary view of the coconut resealed for future consumption.

FIG. 28 is an illustrative view of the coconut resealed for future consumption. Using the tethered plunger stopper 62, the user 12 can selectively pierce the plunger sleeve membrane 78 allowing access to a desired portion of the coconut water and then reseal the coconut by inserting plunger stopper 62 into the plunger sleeve bore 74 thereby preserving the coconut water for later consumption.

Figure 29:
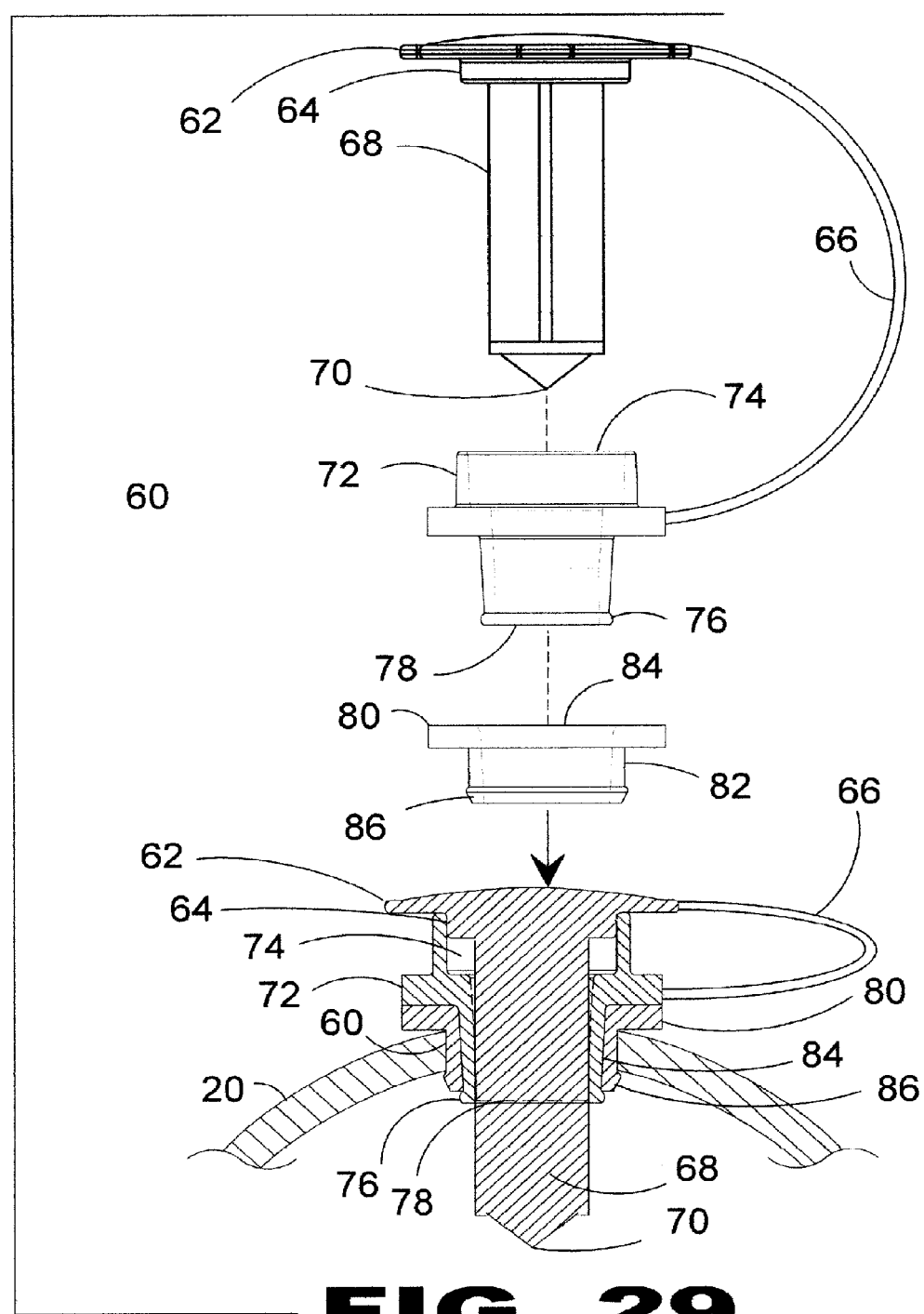
FIG. 29 is an exploded, elevational view of an alternate preferred embodiment of the present invention; and, FIG. 30 is an exploded, elevational view of an alternate preferred embodiment of the present invention.

FIG. 29 is an illustrative view of an alternate preferred embodiment of the present invention. Shown is coconut 20 having aperture 60 placed within the wall having a predetermined diameter so that valve plug 80 seats within said aperture with valve plug collar 82 substantially engaging the wall of aperture 60. Valve plug 80 has valve plug bore 84 for receiving plunger sleeve 72 having plunger sleeve bore 74 with a based positioned plunger sleeve membrane 78 that seals the coconut's contents until plunger stopper 62 having plunger-stopper lance 68 and plunger-stopper lance tip 70 is used to puncture plunger sleeve membrane 78 thereby providing access to the coconut water contained within the coconut. Plunger-stopper 62 is tethered via 66 to plunger sleeve 72. The plunger-stopper 72 serves to provide access to the coconut's contents and also serves as stopper to seal any remaining coconut contents for future use by providing plunger-stopper 64 that seals plunger sleeve bore 74.

Figure 30:
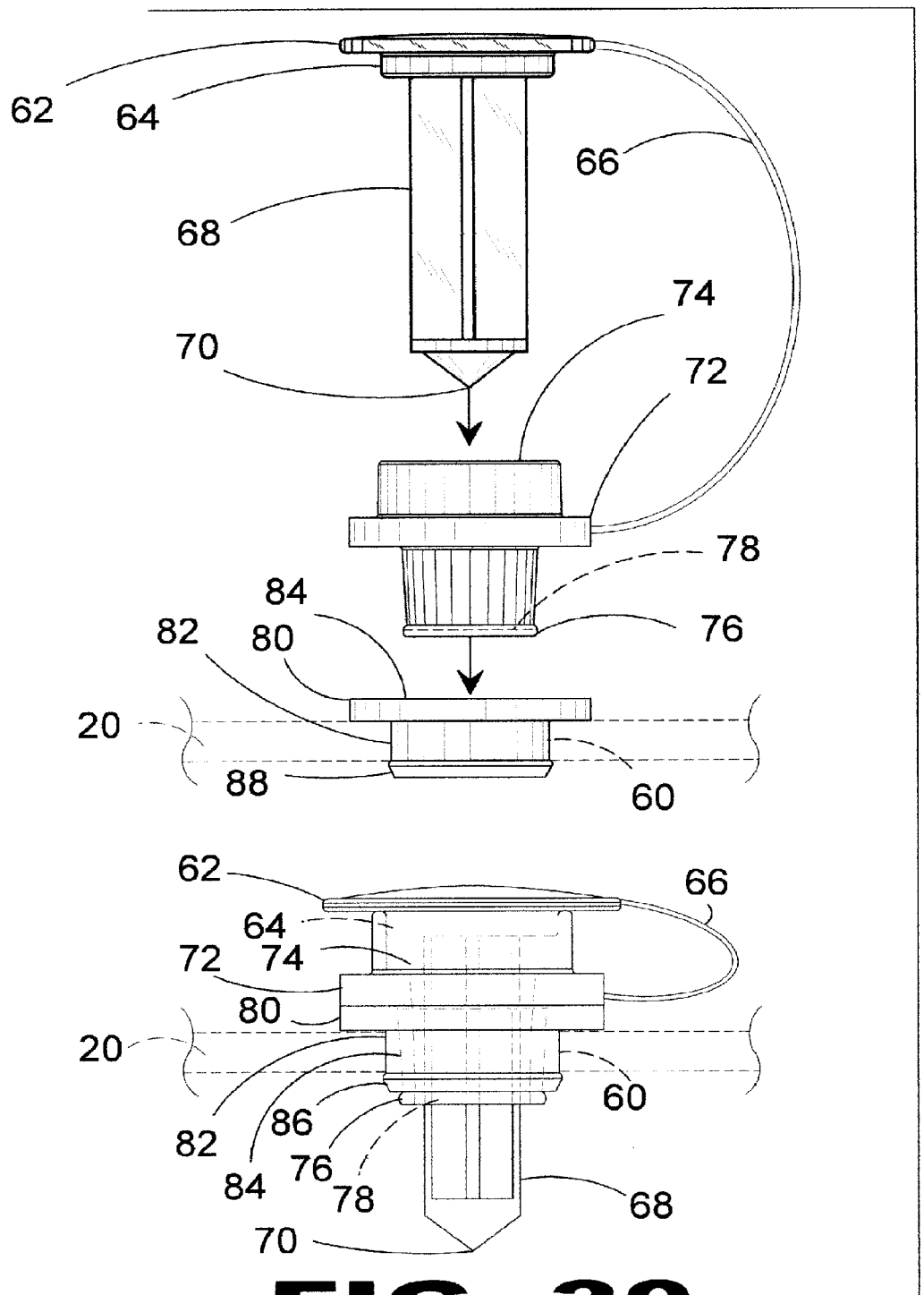

FIG. 30 is an illustrative view of an alternate preferred embodiment of the present invention. Shown is coconut 20 having aperture 60 placed within the wall having a predetermined diameter so that valve plug 80 seats within said aperture with valve plug collar 82 substantially engaging the wall of aperture 60. Valve plug 80 has valve plug bore 84 for receiving plunger sleeve 72 having plunger sleeve bore 74 with a based positioned plunger sleeve membrane 78 that seals the coconut's contents until plunger stopper 62 having plunger-stopper lance 68 and plunger-stopper lance tip 70 is used to puncture plunger sleeve membrane 78 thereby providing access to the coconut water contained within the coconut. Plunger-stopper 62 is tethered via 66 to plunger sleeve 72. The plunger-stopper 72 serves to provide access to the coconut's contents and also serves as stopper to seal any remaining coconut contents for future use by providing plunger-stopper 64 that seals plunger sleeve bore 74.

While only several embodiments of the present invention have been shown and described, it will be obvious to those skilled in the art that many modifications may be made to the present invention without departing from the spirit and scope thereof.

LIST OF REFERENCE NUMERALS

10 Coconut With Spigot of the present invention
12 consumer
14 coconut
16 coconut husk
18 coconut seed
20 coconut seed-case
22 coconut meat
24 coconut seed-case cavity
26 coconut water
28 spigot
30 spout
32 conduit
34 spike-tip
36 grommet
38 spigot cap
40 cap flange
42 cap seal
44 air valve
46 tethered bung
48 straw
50 straw filter
52 stand
54 handle
56 plunger
58 glass
60 coconut aperture
62 plunger-stopper
64 plunger-stopper collar
66 plunger-stopper tether
68 plunger-stopper lance
70 plunger-stopper lance tip
72 plunger sleeve
74 plunger sleeve bore
76 plunger sleeve flange
78 plunger sleeve membrane
80 valve plug
82 valve plug collar
84 valve plug flange
86 pressure

The invention claimed is:

1. A method for accessing a coconut, having a seed-case, a layer of coconut meat inside of the seed-case, and an internal cavity containing sterile coconut water, and removing the sterile water within a coconut, comprising:
    accessing the coconut meat through the seed-case in a manner to keep the coconut water sterile until the water is accessed, by positioning a valve plug having a valve plug bore within a tooled coconut aperture; and
    accessing the coconut water through the coconut meat at a later time, by inserting into the valve plug bore a plunger-stopper that is used to provide access to the coconut water, for removing the coconut water for consumption,
    wherein said plunger-stopper is tethered to said valve plug during shipping and storage.

2. The method as recited in claim 1, wherein said plunger-stopper has a plunger-stopper lance and plunger-stopper tip.

3. A method for providing a coconut, having a seed-case, a layer of coconut meat inside of the seed-case, and an internal cavity containing sterile coconut water, in a condition that is ready for a consumer to access and remove the sterile water within the coconut, the method comprising:
    forming an aperture that extends through the seed-case but does not extend through the layer of coconut meat, thereby maintaining the sterility of the coconut water;
    affixing to the coconut, so as to surround the aperture, a grommet member that has a central passageway generally aligned with the aperture, the grommet member structure engaging with the coconut aperture periphery so as to cooperate with the coconut in a manner to preserve the sterility of the coconut water; and
    coupling, with the coconut, a plunger member that is used to provide access to the coconut water through the grommet member central passageway.

4. A consumer-ready coconut product, based on a coconut having a seed-case, a layer of coconut meat inside of the seed-case, and an internal cavity containing sterile coconut water, the product being in a condition that is ready for a consumer to access and remove the sterile water within the coconut, the product comprising:
    the coconut having a formed aperture that extends through the seed-case but does not extend through the layer of coconut meat, thereby maintaining the sterility of the coconut water; a grommet member affixed to the coconut, so as to surround the aperture, the grommet member having a central passageway generally aligned with the aperture, the grommet member not extending through the layer of coconut meat, thereby maintaining the sterility of the coconut water; and
    a plunger member that is coupled with the coconut.

5. The product of claim 4 wherein the plunger member includes: a plunger member advancing structure located at a first end of the plunger member; and an elongated lance member, coupled to the plunger member, the lance member configured to slide within the grommet member and has a length that is sufficient to penetrate through the layer of coconut meat and into the internal cavity containing the sterile water, when it is inserted through the aperture and the plunger member is advanced in the direction of the grommet member, wherein the apertured coconut with coupled plunger member is sufficiently sealed to protect the coconut water within the coconut from contamination during shipping and storage.

6. The method as claimed in claim 3, wherein the plunger member comprises a collar located at a first end of the plunger member; and an elongated lance member that is configured to slide within the grommet member and has a length that is sufficient to penetrate through the layer of coconut meat and into the internal cavity containing the sterile water, when inserted through the aperture.

7. The method as recited in claim 3, wherein the step of coupling the plunger member comprises inserting the plunger member through the collar member by an amount so that the end of the plunger member only partially penetrates the meat of the coconut.

8. The method as recited in claim 3, wherein the step of coupling the plunger member comprises providing the plunger member tethered in such a way as to be connected to the grommet member.

9. The method as recited in claim 3, wherein the grommet member comprises a valve plug collar and spaced apart valve plug flange connected by an external wall extending therebetween.

10. The method as recited in claim 9, where said valve plug collar when positioned within the coconut aperture substantially engages the coconut aperture exterior periphery.

11. The method as recited in claim 3, wherein said coconut is huskless.

12. The method as recited in claim 10, where said valve plug flange engages the coconut aperture interior periphery thereby preventing lateral movement of said valve seat within said coconut aperture.

* * * * *